(12) United States Patent
Miyashita et al.

(10) Patent No.: US 9,182,060 B2
(45) Date of Patent: *Nov. 10, 2015

(54) SPHERICAL ANNULAR SEAL MEMBER AND METHOD OF MANUFACTURING THE SAME

(71) Applicant: OILES CORPORATION, Minato-ku, Tokyo (JP)

(72) Inventors: Osamu Miyashita, Fujisawa (JP); Eiji Satou, Fujisawa (JP); Koichi Ishida, Fujisawa (JP); Toshikazu Takasago, Nakatsu (JP); Satoshi Matsunaga, Nakatsu (JP)

(73) Assignee: OILES CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,186

(22) Filed: Mar. 26, 2015

(65) Prior Publication Data

US 2015/0198276 A1  Jul. 16, 2015

Related U.S. Application Data

(63) Continuation of application No. 14/363,534, filed as application No. PCT/JP2012/007746 on Dec. 3, 2012, now Pat. No. 9,016,694.

(30) Foreign Application Priority Data

Dec. 9, 2011  (JP) .................. 2011-270519

(51) Int. Cl.
| | |
|---|---|
| *F16J 15/32* | (2006.01) |
| *F16L 23/22* | (2006.01) |
| *F01N 13/18* | (2010.01) |
| *F16L 27/073* | (2006.01) |
| *F16J 15/08* | (2006.01) |
| *F16L 27/053* | (2006.01) |

(Continued)

(52) U.S. Cl.
CPC .. *F16L 23/22* (2013.01); *B21J 3/00* (2013.01); *B21J 5/06* (2013.01); *C10M 111/04* (2013.01); *F01N 13/1827* (2013.01); *F16J 15/062* (2013.01); *F16J 15/064* (2013.01);
(Continued)

(58) Field of Classification Search
CPC ...... F16L 23/18; F16J 15/126; F16J 15/0812; F01N 13/1827
See application file for complete search history.

(56) References Cited

U.S. PATENT DOCUMENTS

| | | |
|---|---|---|
| 4,607,851 A | 8/1986 | Usher |
| 5,451,064 A | 9/1995 | Mercuri et al. |

(Continued)

FOREIGN PATENT DOCUMENTS

| | | |
|---|---|---|
| CN | 1555467 A | 12/2004 |
| CN | 101903690 A | 12/2010 |

(Continued)

OTHER PUBLICATIONS

International Search Report for PCT/JP2012/007746 mailed Jan. 15, 2013.

(Continued)

*Primary Examiner* — Gilbert Lee
(74) *Attorney, Agent, or Firm* — Nixon & Vanderhye P.C.

(57) ABSTRACT

A spherical annular seal member 40 includes: a spherical annular base member 38 which is defined by a cylindrical inner surface 34 defining a through hole 33 in a central portion, a partially convex spherical surface 35, and annular end faces 36 and 37 on large- and small-diameter sides of the partially convex spherical surface 35; and an outer layer 39 formed integrally on the partially convex spherical surface 35 of the spherical annular base member 38.

7 Claims, 10 Drawing Sheets

(51) Int. Cl.
*F16J 15/06* (2006.01)
*B21J 3/00* (2006.01)
*B21J 5/06* (2006.01)
*C10M 111/04* (2006.01)

(52) U.S. Cl.
CPC .......... *F16J15/0812* (2013.01); *F16L 27/053* (2013.01); *F16L 27/073* (2013.01); *Y10T 29/49885* (2015.01)

(56) References Cited

U.S. PATENT DOCUMENTS

| | | | |
|---|---|---|---|
| 5,499,825 | A | 3/1996 | Maeda et al. |
| 7,063,330 | B2 | 6/2006 | Kubota et al. |
| 2004/0207162 | A1 | 10/2004 | Kubota et al. |
| 2010/0253011 | A1 | 10/2010 | Maeda et al. |
| 2010/0270754 | A1 | 10/2010 | Kubota et al. |
| 2014/0027986 | A1 | 1/2014 | Miyashita et al. |

FOREIGN PATENT DOCUMENTS

| | | |
|---|---|---|
| JP | 2003-97718 | 4/2003 |
| WO | WO 2009/072295 | 6/2009 |
| WO | WO 2009/078165 | 6/2009 |
| WO | WO 2012/140868 | 10/2012 |

OTHER PUBLICATIONS

Parent; U.S. Appl. No. 14/363,534, filed Jun. 6, 2014, Miyashita et al.
Chinese Office Action issued in Application No. 201280068745.0 dated Apr. 3, 2015 (w/ translation).

SPHERICAL ANNULAR SEAL MEMBER AND METHOD OF MANUFACTURING THE SAME

This application is a continuation of U.S. application Ser. No. 14/363,534, filed on Jun. 6, 2014, now allowed, which is the U.S. national phase of International Application No. PCT/JP2012/007746 filed Dec. 3, 2012 which designated the U.S. and claims priority to JP 2011-270519 filed Dec. 9, 2011, the entire contents of each of which are hereby incorporated by reference.

TECHNICAL FIELD

The present invention relates to a spherical annular seal member used in a spherical joint for an automobile exhaust pipe and a method of manufacturing the same.

BACKGROUND ART

As for exhaust gases of an automobile engine, in FIG. 21 which shows one example of an exhaust passage of an automobile engine, exhaust gases generated in the respective cylinders (not shown) of the engine are gathered in an exhaust manifold catalyst converter 600 and are sent to a sub muffler 603 through an exhaust pipe 601 and an exhaust pipe 602. The exhaust gases which passed through this sub muffler 603 are further sent to a muffler 606 through an exhaust pipe 604 and an exhaust pipe 605, and are released to the atmosphere through this muffler 606.

Exhaust system members such as these exhaust pipes 601 and 602 as well as 604 and 605, the sub muffler 603, and the muffler 606 are subjected to repeated stress owing to such as the roll behavior and vibration of the engine. Particularly in the case of a high-speed rotation and high-output engine, the stress applied to the exhaust system members becomes quite large. Accordingly, this large stress can possibly cause a fatigue failure in the exhaust system members, and the engine vibration can cause the exhaust system members to resonate, thereby deteriorating compartment quietness in some cases. To overcome these problems, a connecting portion 607 between the exhaust manifold catalyst converter 600 and the exhaust pipe 601 and a connecting portion 608 between the exhaust pipe 604 and the exhaust pipe 605 are movably connected by a vibration absorbing mechanism such as an exhaust pipe spherical joint or a bellows type joint, whereby advantages are provided in that the stress is absorbed to which the exhaust system members are repeatedly subjected due to such as the roll behavior and vibration of the automobile engine, thereby preventing the fatigue failure and the like of these exhaust system members and overcoming the problem that the engine vibration causes the exhaust system members to resonate and deteriorates the quietness of the compartment interior.

PRIOR ART DOCUMENTS

Patent Documents

Patent Document 1: JP-A-54-76759
Patent Document 2: WO 2009/078165

SUMMARY OF THE INVENTION

Problems to be Solved by the Invention

As one example of the above-described vibration absorbing mechanism, it is possible to cite an exhaust pipe joint described in Patent Document 1 and an exhaust seal which is used in that joint. The exhaust seal described in this Patent Document 1 has advantages in that it is heat resistant, excels in affinity with a mating member, and has remarkably improved impact strength; however, the exhaust seal has a drawback in that it often generates abnormal noise when it undergoes friction under dry frictional conditions. The drawback of this exhaust seal is conceivably attributable to, among others, the fact that there is a large difference between the coefficient of static friction and the coefficient of dynamic friction of a heat-resistant material (such as expanded graphite) for forming that exhaust seal, and to the fact that the frictional resistance of the exhaust seal constituted by this heat-resistant material exhibits negative resistance with respect to its sliding velocity.

As a spherical annular seal member for overcoming the drawbacks of the above-described exhaust seal member, one disclosed in Patent Document 2 is known. A spherical annular seal member 700 described in this Patent Document 2 and shown in FIGS. 22 and 23 is comprised of: a spherical annular base member 705 defined by a cylindrical inner surface 701, a partially convex spherical surface 702, and annular end faces 703 and 704 on the large- and small-diameter sides of the partially convex spherical surface 702; and an outer layer 706 formed integrally on the spherical annular base member 705. The spherical annular base member 705 includes a reinforcing member 707 made from a metal wire net and a heat-resistant material 708 containing expanded graphite and compressed in such a manner as to fill meshes of the metal wire net of the reinforcing member 707 and to be integrated with the reinforcing member 707 in mixed form, and the outer layer 706 is comprised of a base layer 714 which includes a reinforcing member 709 made from a metal wire net and compressed and a heat-resistant material 713 containing expanded graphite, compressed in such a manner as to fill meshes of the metal wire net of the reinforcing member 709 and to be tightly pressure bonded to the reinforcing member 709, and having a surface 712 which is flush with a surface 710 of the reinforcing member 709 and forms an outer layer intermediate surface 711 together with that surface 710, the base layer 714 being formed integrally with the partial convex spherical surface 702, and of a sliding layer 715 of a lubricating composition which is integrally adhered to and formed on the base layer 714 at the outer layer intermediate surface 711. The outer layer intermediate surface 711 of the base layer 714 formed by the reinforcing member 709 and the heat-resistant material 713 in the outer layer 706 is dotted with the surface 710 of that reinforcing member 709 at an area ratio of 5 to 35%, the surface roughness of the outer layer intermediate surface 711 is 5 to 30 μm in the arithmetic mean roughness Ra, and a surface 716 of the outer layer 706 exposed to the outside is constituted by the smooth surface 717 of the sliding layer 715.

In the spherical annular seal member 700, the outer layer intermediate surface 711 of the base layer 714 is dotted with the surface 710 of the reinforcing member 709 at an area ratio of 5 to 35%, the sliding layer 715 of a lubricating composition is integrally formed by being coated on that outer layer intermediate surface 711, and the surface 716 of the outer layer 706 exposed to the outside is formed by a smooth surface 717 of the sliding layer 715. Therefore, in the sliding friction with the mating member, it is possible to avoid local friction of the reinforcing member 709 at the outer layer 706 with the surface of the mating member, with the result that it is possible to prevent the damaging and roughening of the surface of the mating member due to sliding friction as practically as possible, thereby making it possible to prevent a decline in sealability. In addition, since the sliding friction takes place through an appropriate lubricating film formed on the surface of the mating member by virtue of the action of scraping off an excessive lubricating film formed on the surface of the mating member, it is possible to prevent the generation of abnormal frictional noise as practically as possible.

The spherical annular seal member 700 described in Patent Document 2 has the above-described advantages. However, in cases where very small oscillating motions or excessive axial loads occurring during, for instance, idling or waiting for a traffic light are applied to the spherical annular seal member 700 continuously for long periods of time, the sliding layer 715 of the outer layer 706 can be lost by the sliding friction with the mating member, and the sliding friction can then shift to that with the outer layer intermediate surface 711 constituted by the surface 710 of the reinforcing member 709 and the surface 712 of the heat-resistant material 713 flush with the surface 710 of that reinforcing member 709, with the result that the reinforcing member 709 of the outer layer intermediate surface 711 can possibly become worn. If the reinforcing member 709 of the outer layer intermediate surface 711 becomes worn, the sliding friction shifts to that with the heat-resistant material 713 of the outer layer intermediate surface 711, in which case, in the same way as the exhaust seal described in the above-described Patent Document 1, the surface of sliding friction with the mating member is constituted by the exposed surface of the heat-resistant material 713 alone, and therefore there is a possibility of generating abnormal frictional noise which is a drawback similar to that of the exhaust seal described in the above-described Patent Document 1.

As a result of conducting strenuous studies in view of the above-described circumstances, by focusing attention on the partially convex spherical surface of the spherical annular seal member including the outer layer constituting the surface of sliding friction with the mating member, the present inventors obtained the following finding: A spherical annular seal member having an outer layer, which includes a reinforcing member made from a metal wire net, a solid lubricant consisting of a lubricating composition, and a heat-resistant material containing expanded graphite, and in which the heat-resistant material and the solid lubricant are compressed in such a manner as to fill the meshes of the metal wire net of the reinforcing member, such that an occupying area ratio of a surface constituted by the reinforcing member on an outer surface formed into a smooth composite surface in which the surface constituted by the reinforcing member and a surface constituted by the solid lubricant are exposed in mixed form is 30 to 60%, and such that the reinforcing member is overlaid on the partially convex spherical surface of the spherical annular base member densely in a radial direction, in its sliding friction with the mating member, undergoes sliding friction by the smooth composite surface where the surface of the heat-resistant material and the surface of the reinforcing member are constantly exposed in mixed form, so that the load applied to each of the heat-resistant material and the reinforcing member is reduced, with the result that even if very small oscillating motions or excessive axial loads are applied continuously for long periods of time, it is possible to prevent as practically as possible the generation of abnormal frictional noise without causing damage to the mating member.

The present invention has been devised in view of the above-described finding, and its object is to provide a spherical annular seal member which is capable of preventing as practically as possible the generation of abnormal frictional noise in its sliding friction with the mating member, as well as a method of manufacturing the same.

Means for Overcoming the Problems

A spherical annular seal member for use in an exhaust pipe joint in accordance with the present invention comprises: a spherical annular base member defined by a cylindrical inner surface, a partially convex spherical surface, and annular end faces on large- and small-diameter sides of the partially convex spherical surface; and an outer layer formed integrally on the partially convex spherical surface of the spherical annular base member, wherein the spherical annular base member includes a reinforcing member for the spherical annular base member made from a compressed knitted metal wire net which is knitted by using a fine metal wire with a diameter of 0.28 to 0.32 mm and whose mesh size is 4 to 6 mm long and 3 to 5 mm wide and a heat-resistant material for the spherical annular base member containing expanded graphite and compressed in such a manner as to fill meshes of the knitted metal wire net of the reinforcing member and to be formed integrally with the reinforcing member in mixed form, and wherein the outer layer includes a reinforcing member for the outer layer made from a compressed knitted metal wire net which is knitted by using a fine metal wire with a diameter of 0.10 to 0.20 mm and whose mesh size is 1.0 to 3.0 mm long and 0.5 to 2.5 mm wide, a solid lubricant consisting of a lubricating composition, and a heat-resistant material for the outer layer containing expanded graphite, the heat-resistant material and the solid lubricant for the outer layer being compressed in such a manner as to fill meshes of the knitted metal wire net of the reinforcing member for the outer layer, the reinforcing member being overlaid on the partially convex spherical surface of the spherical annular base member densely in a radial direction, an outer surface of the outer layer being formed into a smooth composite surface in which a surface constituted by the reinforcing member for the outer layer and a surface constituted by the solid lubricant are exposed in mixed form, an occupying area ratio of the surface constituted by the reinforcing member for the outer layer on the outer surface of the outer layer being 30 to 60%.

According to the spherical annular seal member in accordance with the present invention, the outer layer serving as the surface of sliding friction with the mating member includes a reinforcing member for the outer layer made from a compressed knitted metal wire net which is knitted by using a fine metal wire with a diameter of 0.10 to 0.20 mm and whose mesh size is 1.0 to 3.0 mm long and 0.5 to 2.5 mm wide, a solid lubricant consisting of a lubricating composition, and a heat-resistant material for the outer layer containing expanded graphite, the heat-resistant material and the solid lubricant for the outer layer being compressed in such a manner as to fill meshes of the knitted metal wire net of the reinforcing member for the outer layer, the reinforcing member for the outer layer being overlaid on the partially convex spherical surface of the spherical annular base member densely in a radial direction, an outer surface of the outer layer being formed into a smooth composite surface in which a surface constituted by the reinforcing member for the outer layer and a surface constituted by the solid lubricant are exposed in mixed form, an occupying area ratio of the surface constituted by the reinforcing member for the outer layer on the outer surface of the outer layer being 30 to 60%. Therefore, in the sliding friction with the mating member, the load applied to each of the heat-resistant material and the reinforcing member for the outer layer is reduced, with the result that even if very small oscillating motions or excessive axial loads are applied continuously for long periods of time, it is possible to prevent as practically as possible the generation of abnormal frictional noise without causing damage to the mating member.

In addition, even if the reinforcing member in the outermost layer of the outer layer is worn away and lost due to the sliding friction with the mating member, the sliding friction with the mating member shifts to the sliding friction with the composite surface where the surface constituted by the reinforcing member located in its lower layer and the surface of the heat-resistant material filled in the meshes of the metal wire net of that reinforcing member are present in mixed form, and the load applied to each of the heat-resistant material and reinforcing member for the outer layer is reduced. As a result, even if very small oscillating motions or excessive axial loads are applied continuously for long periods of time, the possibility of causing damage such as sliding friction tracks on the surface of the mating member is minimal, and it is possible to prevent as practically as possible the coarsening of the mating material surface due to the damage. Consequently, it is possible to prevent as practically as possible a decline in sealability between the partially convex spherical surface of the outer layer and the mating member and prevent the generation of abnormal frictional noise as practically as possible.

In the spherical annular seal member in accordance with the present invention, its cylindrical inner surface may be an exposed surface constituted by the expanded graphite of the heat-resistant material for the spherical annular base member, an exposed surface constituted by the knitted metal wire net of the reinforcing member for the spherical annular base member, or an exposed surface where they are present in mixed form.

In the spherical annular seal member having the exposed surface in which the knitted metal wire net of the reinforcing member is exposed on the cylindrical inner surface, its cylindrical inner peripheral surface may include a cylindrical surface having a predetermined width in a direction from a small-diameter side annular end toward a large-diameter side annular end of the spherical annular base member and having an identical diameter between the ends, a truncated conical surface whose diameter is gradually increased from an end of the cylindrical surface toward the large-diameter side annular end of the spherical annular base member and which has a predetermined width in a direction from the end of the cylindrical surface toward the large-diameter side annular end of the spherical annular base member, and an enlarged-diameter cylindrical surface having a predetermined width in a direction from a large-diameter side annular end of the truncated conical surface toward the large-diameter side annular end of the spherical annular base member and having a diameter corresponding to an outside diameter of a pipe end portion of an exhaust pipe. In this case, the cylindrical surface may be continuously connected at its one end to the small-diameter side annular end of the spherical annular base member, the truncated conical surface may be continuously connected at its small-diameter side annular end to another end of the cylindrical surface and may be continuously connected at its large-diameter side annular end to one end of the enlarged-diameter cylindrical inner surface, and the enlarged-diameter cylindrical inner surface may be continuously connected at its other end to the large-diameter side annular end of the spherical annular base member and may be formed with an identical diameter between its both ends.

According to such a spherical annular seal member, the cylindrical inner peripheral surface has the cylindrical surface of a predetermined width, the truncated conical surface of a predetermined width, and the enlarged-diameter cylindrical surface of a predetermined width, and if the diameter of the enlarged-diameter cylindrical surface corresponds to the outside diameter of the exhaust pipe, the spherical annular base member is strongly pressed and compressed at its truncated conical surface of the predetermined width and its cylindrical surface of the predetermined width by the exhaust pipe which is inserted into the spherical annular seal member, so that firm fixation takes place between that cylindrical inner peripheral surface and the outer surface of the exhaust pipe, with the result that the spherical annular seal member is firmly fixed by the outer surface of the exhaust pipe. Accordingly, the rotation of the spherical annular seal member about the exhaust pipe is reliably prevented, and abnormal frictional noise does not occur which is ascribable to sliding between the large-diameter side annular end face of the spherical annular base member of the spherical annular seal member and the flange formed on the outer peripheral surface of the exhaust pipe against which that annular end face abuts.

In the spherical annular seal member in accordance with the present invention, each of the heat-resistant material for the spherical annular base member and the heat-resistant material for the outer layer may further contain 1.0 to 16.0% by mass of a phosphate serving as an oxidization inhibitor and may still further contain 0.05 to 5.0% by mass of nitric acid.

The heat-resistant material containing a phosphate or a phosphate and nitric acid each serving as an oxidization inhibitor is capable of improving the heat resistance and oxidative wear characteristics of the spherical annular seal member itself, and permits the use of the spherical annular seal member in a high-temperature region.

In the spherical annular seal member in accordance with the present invention, the lubricating composition preferably contains 23 to 57% by mass of a hexagonal boron nitride, 5 to 15% by mass of hydrated alumina, and 33 to 67% by mass of a polytetrafluoroethylene resin.

According to such a spherical annular seal member, since the outer surface of the outer layer is formed into a smooth composite surface in which the surface constituted by the knitted metal wire net for the outer layer and the surface constituted by the solid lubricant containing 23 to 57% by mass of a hexagonal boron nitride, 5 to 15% by mass of hydrated alumina, and 33 to 67% by mass of a polytetrafluoroethylene resin are exposed in mixed form, it is possible to prevent the solid lubricant from dropping off the outer surface of the outer layer, with the result that the sliding with the mating member takes place over extended periods of time by the smooth surface in which the solid lubricant and the reinforcing member for the outer layer are present in mixed form, thereby making it possible to prevent the generation of abnormal frictional noise as practically as possible.

A method of manufacturing a spherical annular seal member in accordance with the present invention for use in an exhaust pipe joint and including: a spherical annular base member defined by a cylindrical inner surface, a partially convex spherical surface, and annular end faces on large- and small-diameter sides of the partially convex spherical surface; and an outer layer formed integrally on the partially convex spherical surface of the spherical annular base member, comprises the steps of: (a) preparing an expanded graphite sheet constituted by expanded graphite; (b) preparing a belt-shaped knitted metal wire net which is knitted by using a fine metal wire with a diameter of 0.28 to 0.32 mm and whose mesh size is 4 to 6 mm long and 3 to 5 mm wide; (c) after forming a superposed assembly by superposing the belt-shaped knitted metal wire net on the expanded graphite sheet, convoluting the superposed assembly into a hollow cylindrical shape, to thereby form a tubular base member; (d) preparing another expanded graphite sheet constituted by expanded graphite and forming a coating layer of a solid lubricant on one surface of the other expanded graphite sheet, to thereby form a multilayer sheet; (e) inserting the multilayer sheet between two layers of a hollow cylindrical knitted metal wire net which is knitted by using a fine metal wire with a diameter of 0.10 to 0.20 mm and whose mesh size is 1.0 to 3.0 mm long and 0.5 to 2.5 mm wide, and forming the hollow cylindrical knitted metal wire net into a flattened knitted metal wire net by pressurizing in a thicknesswise direction of the multilayer sheet the hollow cylindrical knitted metal wire net with the multilayer sheet inserted between the two layers, such that the expanded graphite of the other expanded graphite sheet of the multilayer sheet and the solid lubricant of the coating layer formed on the one surface of the expanded graphite sheet are filled in meshes of the flattened knitted metal wire net, to thereby form an outer surface layer forming member consisting of the expanded graphite of the other expanded graphite sheet, the solid lubricant of the coating layer, and the flattened knitted metal wire net integrated with the expanded graphite and the solid lubricant in mixed form, an occupying area ratio of a surface constituted by the flattened knitted metal wire net on an outer surface where the surface constituted by the flattened knitted metal wire net and a surface constituted by the solid lubricant of the coating layer formed on the one surface of the other expanded graphite sheet are present in mixed form being 30 to 60%; (f) convoluting the outer surface layer forming member around an outer peripheral surface of the tubular base member in a state in which the outer surface where the surface constituted by the belt-shaped knitted metal wire net of the outer surface layer forming member and the surface constituted by the solid lubricant are present in mixed form is placed on an outer side, to thereby form a cylindrical preform; and (g) preparing a stepped core and a die which has a cylindrical inner wall surface, a partially concave spherical wall surface continuous to the cylindrical inner wall surface, and a through hole, and in which a hollow cylindrical portion and a spherical annular hollow portion continuous to the hollow cylindrical portion are formed therein as the stepped core is fittingly inserted in the through hole, fitting the cylindrical preform over a core outer peripheral surface of the stepped core, fittingly inserting the stepped core into the through hole of the die, and subjecting the cylindrical preform to compression forming in the die in an axial direction of the core, wherein the spherical annular base member includes a reinforcing member for the spherical annular base member made from a compressed knitted metal wire net which is knitted by using the fine metal wire with the diameter of 0.28 to 0.32 mm and whose mesh size is 4 to 6 mm long and 3 to 5 mm wide and a heat-resistant material for the spherical annular base member containing the expanded graphite and compressed in such a manner as to fill the meshes of the knitted metal wire net of the reinforcing member and to be formed integrally with the reinforcing member in mixed form, and wherein the outer layer includes a reinforcing member for the outer layer made from a compressed knitted metal wire net which is knitted by using the fine metal wire with a diameter of 0.10 to 0.20 mm and whose mesh size is 1.0 to 3.0 mm long and 0.5 to 2.5 mm wide, the solid lubricant consisting of a lubricating composition, and a heat-resistant material for the outer layer containing expanded graphite, the heat-resistant material for the outer layer and the solid lubricant being compressed in such a manner as to fill the meshes of the knitted metal wire net of the reinforcing member for the outer layer, the reinforcing member for the outer layer being overlaid on the partially convex spherical surface of the spherical annular base member densely in a radial direction, an outer surface of the outer layer being formed into a smooth composite surface in which a surface constituted by the reinforcing member for the outer layer and a surface constituted by the solid lubricant are exposed in mixed form, the occupying area ratio of the surface constituted by the reinforcing member for the outer layer on the outer surface of the outer layer being 30 to 60%.

According to the method of manufacturing a spherical annular seal member in accordance with the present invention, the multilayer sheet having the coating layer of the solid lubricant formed on one surface of another expanded graphite sheet is inserted between two layers of a hollow cylindrical knitted metal wire net which is knitted by using a fine metal wire with a diameter of 0.10 to 0.20 mm and whose mesh size is 1.0 to 3 mm long and 0.5 to 2.5 mm wide. The hollow cylindrical knitted metal wire net is formed into a flattened knitted metal wire net by pressurizing in the thicknesswise direction of the multilayer sheet the hollow cylindrical knitted metal wire net with the multilayer sheet inserted between the two layers, such that the expanded graphite of the other expanded graphite sheet of the multilayer sheet and the solid lubricant of the coating layer formed on the one surface of that expanded graphite sheet are filled in meshes of the flattened knitted metal wire net, to thereby form an outer surface layer forming member consisting of the expanded graphite of the other expanded graphite sheet, the solid lubricant of the coating layer, and the flattened knitted metal wire net integrated with the expanded graphite and the solid lubricant in mixed form, the occupying area ratio of the surface constituted by the flattened knitted metal wire net on the outer surface where the surface constituted by the flattened knitted metal wire net and the surface constituted by the solid lubricant of the coating layer formed on the one surface of the other expanded graphite sheet are present in mixed form being 30 to 60%.

In the outer layer formed on the partially convex spherical surface of the spherical annular base member by this outer layer forming member, the reinforcing member for the outer layer is overlaid on the partially convex spherical surface of the spherical annular base member densely in the radial direction; therefore, with the spherical annular seal member in accordance with the manufacturing method of the present invention, even if the reinforcing member in the outermost layer of the outer layer is worn away and lost due to the sliding friction with the mating member, the sliding friction with the mating member shifts to the sliding friction with the composite surface where the surface constituted by the reinforcing member located in next lower layer subsequent to the lost outermost layer and the surface of the heat-resistant material filled in the meshes of the metal wire net of that reinforcing member are present in mixed form, and the load applied to each of the heat-resistant material and reinforcing member for the outer layer is reduced. As a result, even if very small oscillating motions or excessive axial loads are applied continuously for long periods of time, the possibility of causing damage such as sliding friction tracks on the surface of the mating member is minimal, and it is possible to prevent as practically as possible the coarsening of the mating material surface due to the damage. Consequently, it is possible to prevent as practically as possible a decline in sealability between the partially convex spherical surface of the outer layer and the mating member and prevent the generation of abnormal frictional noise as practically as possible.

In the method of manufacturing a spherical annular seal member in accordance with the present invention, as the cylindrical preform disposed in the hollow cylindrical portion and the spherical annular hollow portion of the die is subjected to compression forming by a punch under a pressure of 1 to 3 tons/cm² in the direction of the core axis, it is possible to obtain a spherical annular seal member including: a spherical annular base member having a through hole in its central portion and defined by a cylindrical inner surface, a partially convex spherical surface, and annular end faces on large- and small-diameter sides of the partially convex spherical surface; and an outer layer formed integrally on the partially convex spherical surface of the spherical annular base member.

A second method of manufacturing a spherical annular seal member in accordance with the present invention comprises, in the step (c) of the above-described first manufacturing method, the step of, after forming a superposed assembly by superposing the belt-shaped knitted metal wire net on the expanded graphite sheet, convoluting the superposed assembly into a hollow cylindrical shape such that the knitted metal wire net is exposed on an inner peripheral side and the expanded graphite sheet is exposed on an outer peripheral side, to thereby form a tubular base member, and also comprises a step of subsequently forming a cylindrical preform in a method similar to that of the above-described first manufacturing method.

In addition, the second method of manufacturing a spherical annular seal member in accordance with the present invention further comprises the step of preparing a stepped core, on one end portion of which is detachably fitted a cap having a bottomed cylindrical shape with a bottom portion provided at one end portion thereof and an opening portion provided at another end portion thereof and having on an outer peripheral surface on a side of the opening portion a truncated conical surface portion which is gradually enlarged in diameter from the other end portion, preparing a die which has a cylindrical wall surface, a partially concave spherical wall surface continuous to the cylindrical wall surface, and a through hole, and in which a hollow cylindrical portion and a spherical annular hollow portion continuous to the hollow cylindrical portion are formed therein as the stepped core is fittingly inserted in the through hole, fitting the cylindrical preform over an outer peripheral surface of the cap of the stepped core, fittingly inserting the stepped core into the through hole of the die, and subjecting the cylindrical preform to compression forming in the die in an axial direction of the core.

In the second manufacturing method, as the cylindrical preform disposed in the hollow cylindrical portion and the spherical annular hollow portion of the die is subjected to compression forming by a punch under a pressure of 1 to 3 tons/cm² in the direction of the core axis, it is possible to obtain a spherical annular seal member including: a spherical annular base member having a through hole in its central portion and defined by a cylindrical inner surface having a cylindrical surface, a truncated conical surface continuous to the cylindrical surface, and an enlarged-diameter cylindrical inner surface continuous to the truncated conical surface, a partially convex spherical surface, and annular end faces on the large- and small-diameter sides of the partially convex spherical surface; and an outer layer formed integrally on the partially convex spherical surface of the spherical annular base member.

In the method of manufacturing a spherical annular seal member in accordance with the present invention, each of the expanded graphite sheets may further contain 1.0 to 16% by mass of a phosphate serving as an oxidization inhibitor and may still further contain 0.5 to 5.0% by mass of nitric acid.

The coating layer on the one surface of the other expanded graphite sheet serving as the outer layer may be formed by applying an aqueous dispersion onto that one surface by means of brushing, roller coating, spraying, or the like, the aqueous dispersion being one in which hexagonal boron nitride and polytetrafluoroethylene resin are dispersedly contained in an alumina sol in which hydrated alumina particles are dispersedly contained in water containing an acid as a dispersion medium and whose hydrogen ion concentration (pH) exhibits 2 to 3, the aqueous dispersion dispersedly containing as a solid content 30 to 50% by mass of the lubricating composition containing 23 to 57% by mass of hexagonal boron nitride, 33 to 67% by mass of polytetrafluoroethylene resin, and 5 to 15% by mass of hydrated alumina.

Advantages of the Invention

According to the present invention, the outer layer is formed such that a reinforcing member for the outer layer made from a compressed knitted metal wire net which is knitted by using a fine metal wire with a diameter of 0.10 to 0.20 mm and whose mesh size is 1.0 to 3.0 mm long and 0.5 to 2.5 mm wide, a solid lubricant consisting of a lubricating composition, and a heat-resistant material for the outer layer containing expanded graphite are compressed in such a manner as to fill the meshes of the knitted metal wire net of the reinforcing member for the outer layer, the reinforcing member for the outer layer being overlaid on the partially convex spherical surface of the spherical annular base member densely in a radial direction, an outer surface of the outer layer being formed into a smooth composite surface in which a surface constituted by the reinforcing member for the outer layer and a surface constituted by the solid lubricant are exposed in mixed form, an occupying area ratio of the surface constituted by the reinforcing member for the outer layer on the outer surface of the outer layer being 30 to 60%. Therefore, in the sliding friction with the mating member, the load applied to each of the heat-resistant material and the reinforcing member for the outer layer is reduced. Thus, it is possible to provide a spherical annular seal member and a method of manufacturing the same, which, even if very small oscillating motions or excessive axial loads are applied continuously for long periods of time, make it possible to prevent as practically as possible the generation of abnormal frictional noise without causing damage to the mating member.

MODE FOR CARRYING OUT THE INVENTION

Figure 1:
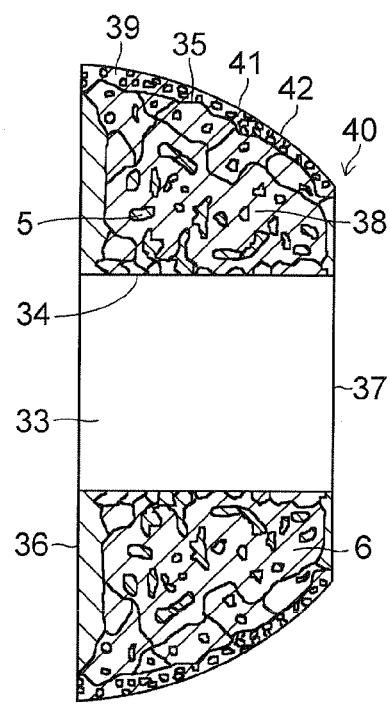
FIG. 1 is an explanatory cross-sectional view of an embodiment of a spherical annular seal member in accordance with the present invention.

Next, a more detailed description will be given of the present invention on the basis of the embodiments illustrated in the drawings. It should be noted that the present invention is not limited to these embodiments.

A description will be given of constituent materials of a spherical annular seal member and a method of manufacturing the spherical annular seal member in accordance with the present invention.

<Expanded Graphite Sheet I and Manufacturing Method Thereof>

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., and natural flake graphite powder having a particle size of 30 to 80 meshes is added to the reaction solution to effect reaction for a predetermined time. After the reaction, acid-treated graphite powder is separated by suction filtration, and an operation is repeated twice in which the acid-treated graphite powder is agitated in water, to thereby sufficiently remove the sulfuric acid content from the acid-treated graphite powder. Then, the acid-treated graphite powder with the sulfuric acid content sufficiently removed is dried in a drying furnace for a predetermined time, and this is used as an acid-treated graphite powder.

The above-described acid-treated graphite powder is subjected to heating (expansion) treatment for 1 to 10 seconds at temperatures of 960 to 1200° C. to produce cracked gas. The gaps between graphite layers are expanded by its gas pressure to form expanded graphite particles (expansion rate: 240 to 300 times). These expanded graphite particles are fed to a twin roller apparatus adjusted to a desired roll nip and is subjected to roll forming, thereby fabricating an expanded graphite sheet I having a desired thickness.

<Expanded Graphite Sheet II and Manufacturing Method Thereof>

While acid-treated graphite powder obtained in a method similar to that for the above-described acid-treated graphite powder is being agitated, a solution in which an aqueous solution of, for example, aluminum primary phosphate [Al$(H_2PO_4)_3$] of a 50% concentration as a phosphate is diluted with methanol is compounded with that acid-treated graphite powder by spraying, and is agitated uniformly to fabricate a mixture having wettability. This mixture having wettability is dried in a drying furnace for a predetermined time. Then, this dried mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). In this expansion treatment process, water in the structural formula of aluminum primary phosphate is eliminated. These expanded graphite particles are fed to the twin roller apparatus adjusted to a desired roll nip and is subjected to roll forming, thereby fabricating an expanded graphite sheet II having a desired thickness.

<Expanded Graphite Sheet III and Manufacturing Method Thereof>

While acid-treated graphite powder obtained in a method similar to that for the above-described acid-treated graphite powder is being agitated, a solution in which an aqueous solution of, for instance, aluminum primary phosphate of a 50% concentration as a phosphate and an aqueous solution of, for instance, orthophosphoric acid ($H_3PO_4$) of a 84% concentration as a phosphoric acid are diluted with methanol is compounded with that acid-treated graphite powder by spraying, and is agitated uniformly to fabricate a mixture having wettability. This mixture having wettability is dried in a drying furnace for a predetermined time. Then, this dried mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 240 to 300 times). In this expansion treatment process, water in the structural formula of aluminum primary phosphate is eliminated, and the orthophosphoric acid undergoes dehydration reaction to produce phosphorus pentoxide. These expanded graphite particles are fed to the twin roller apparatus adjusted to a desired roll nip and is subjected to roll forming, thereby fabricating an expanded graphite sheet III having a desired thickness.

In the expanded graphite sheet II thus fabricated, aluminum primary phosphate is preferably contained at a ratio of 1.0 to 16.0% by mass. In the expanded graphite sheet III, aluminum primary phosphate and phosphorus pentoxide are preferably contained at a ratio of 1.0 to 16.0% by mass and at a ratio of 0.05 to 5.0% by mass, respectively. This expanded graphite containing the phosphate or phosphate and phosphorus pentoxide permits use at, for instance, 600° C. or a high-temperature range exceeding 600° C. since the heat resistance of the expanded graphite itself is improved and the oxidation inhibiting action is imparted thereto. Here, as the phosphate, it is possible to use, in addition to the aforementioned aluminum primary phosphate, lithium primary phosphate ($LiH_2PO_4$), lithium secondary phosphate ($Li_2HPO_4$), calcium primary phosphate [$Ca(H_2PO_4)_2$], calcium secondary phosphate ($CaHPO_4$), aluminum secondary phosphate [$Al_2(HPO_4)_3$], and the like. As the phosphoric acid, it is possible to use metaphosphoric acid ($HPO_3$), polyphosphoric acid, and the like, in addition to the aforementioned orthophosphoric acid.

In the above-described expanded graphite sheets I, II, and III, their density is preferably 1.0 to 1.5 Mg/m³, more preferably 1.0 to 1.2 Mg/m³, and their thickness is suitably 0.30 to 0.60 mm.

<Concerning Knitted Metal Wire Net>

A knitted metal wire net is suitably formed by knitting one or more fine metal wires including, as an iron-based wire, a stainless steel wire made of such as austenitic stainless steels SUS 304, SUS 310S, and SUS 316, a ferritic stainless steel such as SUS 430, or an iron wire (JIS G 3532) or a zinc-coated steel wire (JIS G 3547), or, as a copper-based wire, a copper-nickel alloy (cupro-nickel) wire, a copper-nickel-zinc alloy (nickel silver) wire, a brass wire, or a beryllium copper wire.

As the knitted metal wire net for a spherical annular base member, a fine metal wire whose diameter is 0.28 to 0.32 mm is suitably used. The mesh size, shown in FIG. 6, of this knitted metal wire net formed by the fine metal wire of that diameter is preferably 4 to 6 mm long and 3 to 5 mm wide or thereabouts. Meanwhile, as the knitted metal wire net for an outer layer, a fine metal wire whose diameter is 0.10 to 0.20 mm is suitably used. The mesh size, shown in FIG. 6, of this knitted metal wire net formed by the fine metal wire of that diameter is preferably 1.0 to 3.0 mm long and 0.5 to 2.5 mm wide or thereabouts.

<Concerning Solid Lubricant>

As a solid lubricant, it is possible to illustrate as a preferred example a lubricating composition which contains 23 to 57% by mass of a hexagonal boron nitride (hereinafter abbreviated as "h-BN"), 5 to 15% by mass of hydrated alumina, and 33 to 67% by mass of a polytetrafluoroethylene resin (hereinafter abbreviated as "PTFE").

In the manufacturing process, this solid lubricant is used in the form of an aqueous dispersion in which h-BN and PTFE are dispersedly contained in an alumina sol in which hydrated alumina particles are dispersedly contained in water containing an acid as a dispersion medium and whose hydrogen ion concentration (pH) exhibits 2 to 3, the aqueous dispersion dispersedly containing as a solid content 30 to 50% by mass of a lubricating composition containing 23 to 57% by mass of h-BN, 33 to 67% by mass of PTFE, and 5 to 15% by mass of hydrated alumina. The h-BN powder and the PTFE powder for forming the aqueous dispersion are preferably as fine powders as possible, and fine powders with an average particle size of preferably 10 μm or less, more preferably 0.5 μm or less, are used as these powders.

The acid which is contained in water serving as a dispersion medium for the alumina sol in the aqueous dispersion acts as a deflocculant for stabilizing the alumina sol. As the acid, it is possible to cite inorganic acids such as hydrochloric acid, nitric acid, sulfuric acid, and amidesulfuric acid, but nitric acid, in particular, is preferable.

The hydrated alumina for forming the alumina sol in the aqueous dispersion is a compound which is expressed by a composition formula: $Al_2O_3 \cdot nH_2O$ (in the composition formula, $0<n<3$). In the compound, n is normally a number exceeding 0 (zero) and less than 3, preferably 0.5 to 2, more preferably 0.7 to 1.5 or thereabouts. As the hydrated alumina, it is possible to cite, for example, alumina monohydrate (aluminum hydroxide oxide) such as boehmite ($Al_2O_3 \cdot nH_2O$) and diaspore ($Al_2O_3 \cdot H_2O$), alumina trihydrate such as gibbsite ($Al_2O_3 \cdot 3H_2O$) and bayerite ($Al_2O_3 \cdot 3H_2O$), pseudoboehmite, and the like.

Next, referring to the drawings, a description will be given of a method of manufacturing a spherical annular seal member composed of the above-described constituent materials.

<First Manufacturing Method>

Figure 4:
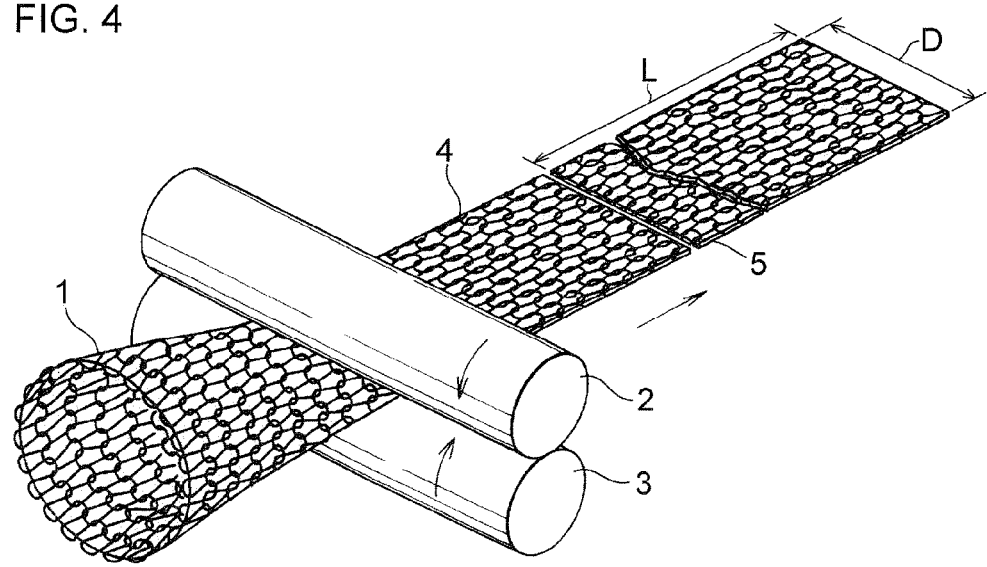
FIG. 4 is an explanatory perspective view of a knitted metal wire net in the process of manufacturing the spherical annular seal member in accordance with the present invention.

(First Process) As shown in FIG. 4, a hollow cylindrical knitted metal wire net 1, which is formed by knitting a fine metal wire with a diameter of 0.28 to 0.32 mm into a cylindrical shape and whose mesh size is 4 to 6 mm long and 3 to 5 mm wide or thereabouts (see FIG. 6), is passed between rollers 2 and 3 so as to be pressurized, thereby fabricating a belt-shaped knitted metal wire net 4 having a predetermined width D. A knitted metal wire net 5 for a spherical annular base member is then prepared by cutting the knitted metal wire net 4 into a predetermined length L.

Figure 5:
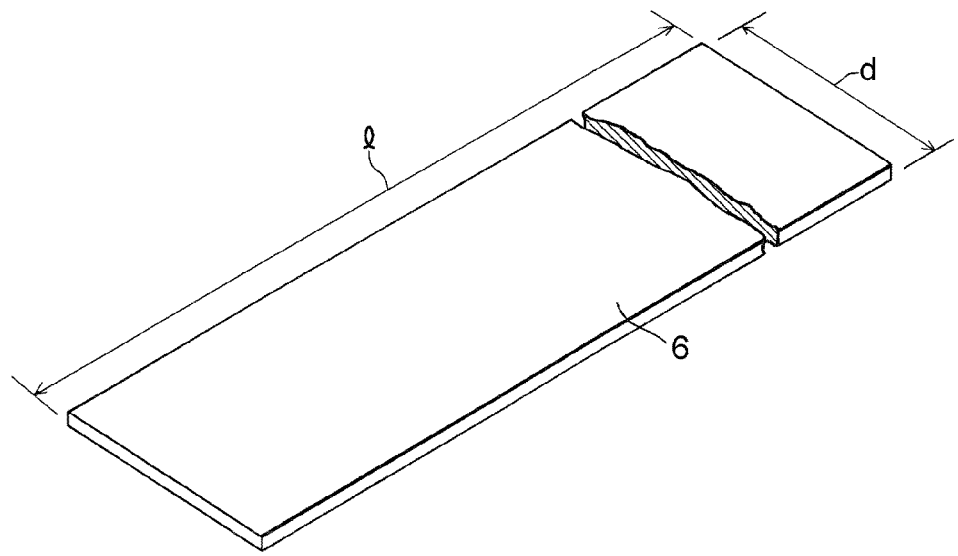
FIG. 5 is an explanatory perspective view of an expanded graphite sheet in the process of manufacturing the spherical annular seal member in accordance with the present invention.

(Second Process) As shown in FIG. 5, an expanded graphite sheet 6 (composed of one of the expanded graphite sheet I, the expanded graphite sheet II, and the expanded graphite sheet III) is prepared which has a width d of from 1.10×D to 2.1×D with respect to the width D of the knitted metal wire net 5, a length l of from 1.30×L to 2.7×L with respect to the length L of the knitted metal wire net 5, a density of preferably 1.0 to 1.5 Mg/m³, more preferably 1.0 to 1.2 Mg/m³, and a thickness of preferably 0.30 to 0.60 mm.

Figure 7:
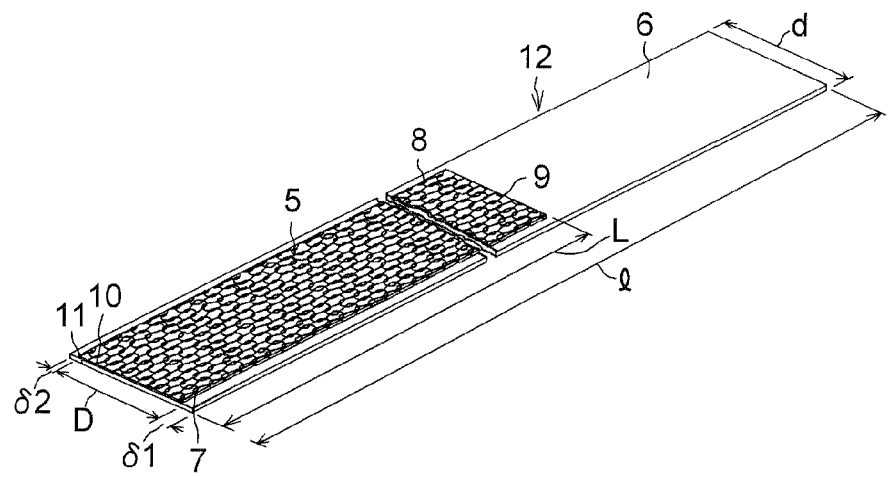
FIG. 7 is an explanatory perspective view of a superposed assembly in the process of manufacturing the spherical annular seal member in accordance with the present invention.

(Third Process) A superposed assembly 12 in which the expanded graphite sheet 6 and the knitted metal wire net 5 are superposed one on top of the other is prepared as follows: To ensure that the expanded graphite of the expanded graphite sheet 6 is wholly exposed on an annular end face 36 on the large-diameter side of a partially convex spherical surface 35 and an annular end face 37 on the small-diameter side thereof in a manufactured spherical annular seal member 40 (see FIG. 1), as shown in FIG. 7, the expanded graphite sheet 6 is made to project in the widthwise direction by a 0.1×D to 0.3×D from one widthwise end 7 of the knitted metal wire net 5, which serves as the annular end face 36 on the large-diameter side of the partially convex spherical surface 35. Also, the amount of widthwise projection, δ1, of the expanded graphite sheet 6 from the end 7 is made greater than the amount of its widthwise projection, δ2, from the other widthwise end 8 of the knitted metal wire net 5, which serves as the annular end face 37 on the small-diameter side of the partially convex spherical surface 35. Further, the expanded graphite sheet 6 is made to project in the longitudinal direction by 1.3×L to 2.7×L from one longitudinal end 9 of the knitted metal wire net 5, while the other longitudinal end 10 of the knitted metal wire net 5 and a longitudinal end 11 of the expanded graphite sheet 6 corresponding to that end 10 are matched.

Figure 8:
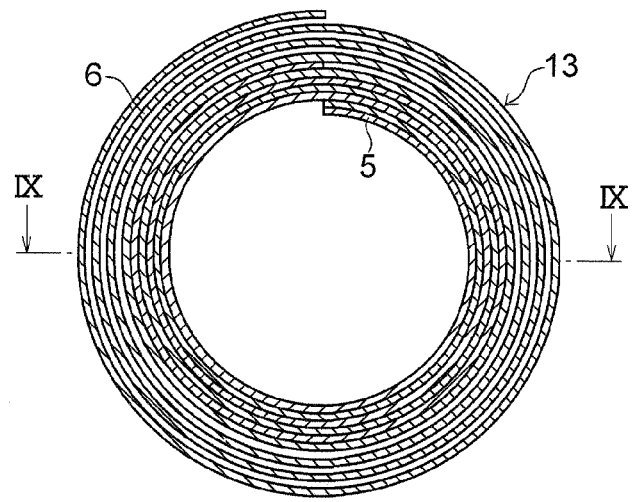
FIG. 8 is an explanatory plan view of a tubular base member in the process of manufacturing the spherical annular seal member in accordance with the present invention.
Figure 9:
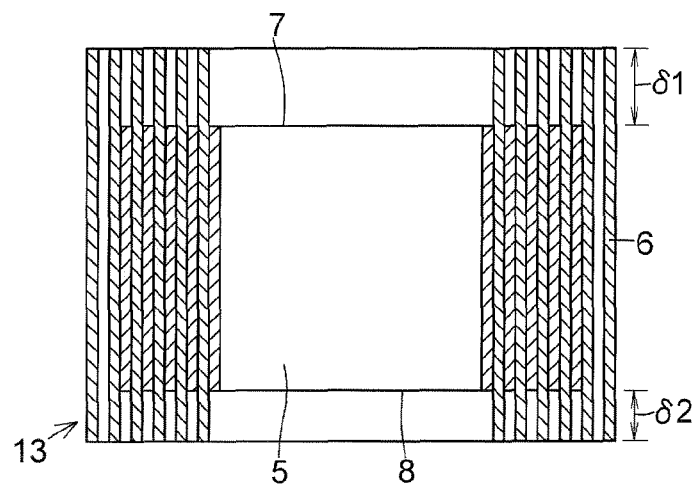
FIG. 9 is an explanatory cross-sectional view, taken in the direction of arrows IX-IX, of the tubular base member shown in FIG. 8.

(Fourth Process) As shown in FIG. 8, the superposed assembly 12 is convoluted around a hollow cylindrical core (not shown) with the knitted metal wire net 5 placed on the inner side and such that expanded graphite sheet 6 is convoluted with one more turn, thereby forming a tubular base member 13 in which the knitted metal wire net 5 is exposed on the inner peripheral side and the expanded graphite sheet 6 is exposed on the outer peripheral side. As the expanded graphite sheet 6, one is prepared in advance which has a length 1 of from 1.3×L to 2.7×L with respect to the length L of the knitted metal wire net 5 so that the number of winding turns of the expanded graphite sheet 6 in the tubular base member 13 becomes greater than the number of winding turns of the knitted metal wire net 5. In the tubular base member 13, as shown in FIG. 9, the expanded graphite sheet 6 on its one widthwise end side projects in the widthwise direction by $\delta 1$ from the one end 7 of the knitted metal wire net 5, and the expanded graphite sheet 6 on its other widthwise end side projects in the widthwise direction by $\delta 2$ from the other end 8 of the knitted metal wire net 5.

(Fifth Process)
<Outer Layer Forming Member and Manufacturing Method Thereof>

An aqueous dispersion is prepared in which h-BN and PTFE are dispersedly contained in an alumina sol in which hydrated alumina particles are dispersedly contained in water serving as a dispersion medium containing nitric acid acting as a deflocculant and whose hydrogen ion concentration (pH) exhibits 2 to 3, the aqueous dispersion dispersedly containing as a solid content 30 to 50% by mass of a lubricating composition containing 23 to 57% by mass of h-BN, 33 to 67% by mass of PTFE, and 5 to 15% by mass of hydrated alumina.

Figure 10:
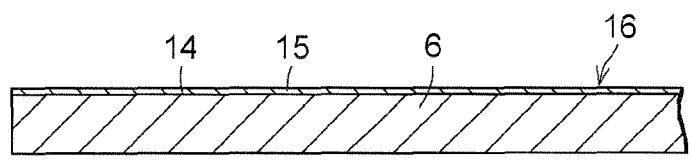
FIG. 10 is an explanatory cross-sectional view of a multi-layer sheet having a coating layer in the process of manufacturing the spherical annular seal member in accordance with the present invention.

An expanded graphite sheet 6 similar to the aforementioned expanded graphite sheet 6 is separately prepared, and the aqueous dispersion dispersedly containing as a solid content 30 to 50% by mass of a lubricating composition containing 23 to 57% by mass of h-BN, 33 to 67% by mass of PTFE, and 5 to 15% by mass of hydrated alumina is applied to one surface 14 of the expanded graphite sheet 6 by means of brushing, roller coating, spraying, or the like, and this was dried to thereby fabricate a multilayer sheet 16 (see FIG. 10) on which a coating layer 15 of the solid lubricant consisting of the lubricating composition has been formed.

Figure 6:
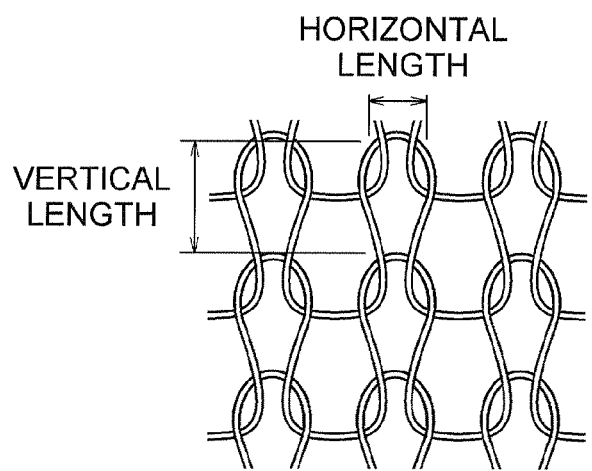
FIG. 6 is an explanatory plan view of meshes of a knitted metal wire net in the process of manufacturing the spherical annular seal member in accordance with the present invention.
Figure 11:
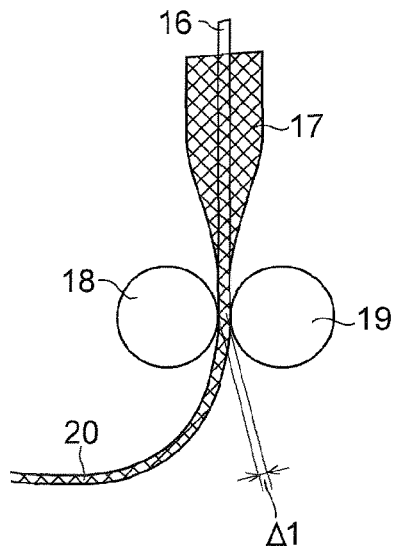
FIG. 11 is an explanatory diagram of the process of producing an outer layer forming member in the process of manufacturing the spherical annular seal member in accordance with the present invention.
Figure 12:
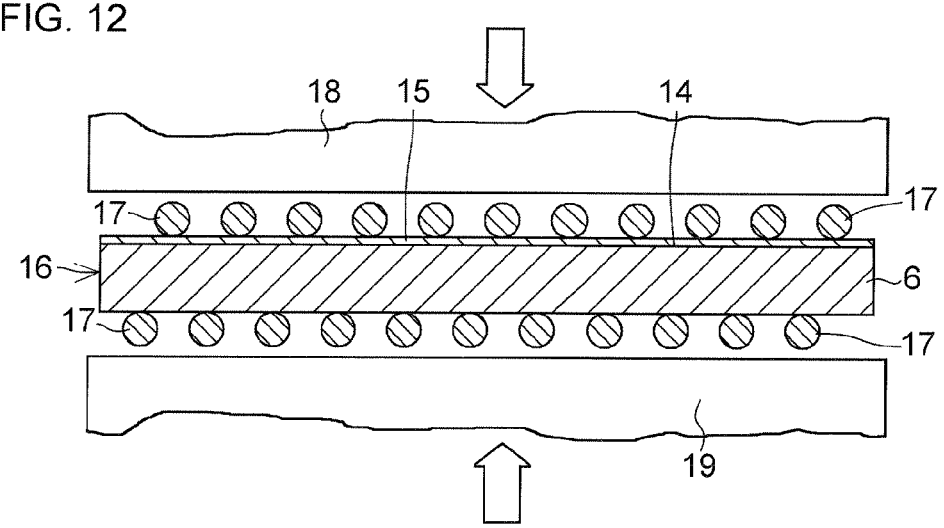
FIG. 12 is an explanatory cross-sectional diagram of the process of producing the outer layer forming member in the process of manufacturing the spherical annular seal member in accordance with the present invention.
Figure 13:
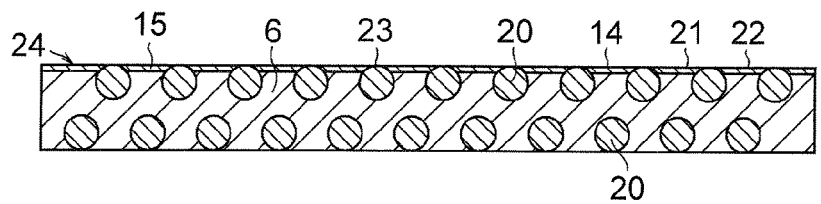
FIG. 13 is an explanatory cross-sectional view of the outer layer forming member in the process of manufacturing the spherical annular seal member in accordance with the present invention.

(Sixth Process) The multilayer sheet 16 having the coating layer 15 of the solid lubricant and formed with a length (width) smaller than the length of the diameter (inside diameter) of the knitted metal wire net 17 is continuously inserted (see FIG. 11) between two layers, i.e., an interior, of a hollow cylindrical knitted metal wire net 17 for an outer layer, which is obtained by continuously knitting a fine metal wire with a diameter of 0.10 to 0.20 mm by a knitting machine (not shown) and whose mesh size is 1.0 to 3.0 mm long and 0.5 to 2.5 mm wide (see FIG. 6). The knitted metal wire net 17 with the multilayer sheet 16 inserted therein is fed, starting with its insertion start end, into a nip $\Delta 1$ between cylindrical rollers 18 and 19 each having a smooth outer peripheral surface so as to be pressurized in the thicknesswise direction of the multilayer sheet 16 (see FIGS. 11, 12, and 13), thereby forming a flattened knitted metal wire net 20 in which the multilayer sheet 16 and the knitted metal wire net 20 are integrated. The multilayer sheet 16 and the knitted metal wire net 20 are thus pressure bonded to each other such that the expanded graphite of the expanded graphite sheet 6 of the multilayer sheet 16 and the solid lubricant of the coating layer 15 coating the surface 14 of the expanded graphite sheet 6 are filled in the meshes of the knitted metal wire net 20, and portions of the knitted metal wire net 20 are exposed on an outer surface 21 together with a surface 22 constituted by the solid lubricant of the coating layer 15, while the other portions of the knitted metal wire net 20 are embedded in the solid lubricant of the coating layer 15 and the expanded graphite of the expanded graphite sheet 6. Thus, an outer layer forming member 24 (see FIG. 13) is fabricated in which the occupying area ratio of a surface 23 constituted by the knitted metal wire net 20 on the outer surface 21 is 30 to 60%, and the surface 23 constituted by the knitted metal wire net 20 and the surface 22 constituted by the solid lubricant are exposed on the outer surface 21 in mixed form.

Figure 14:
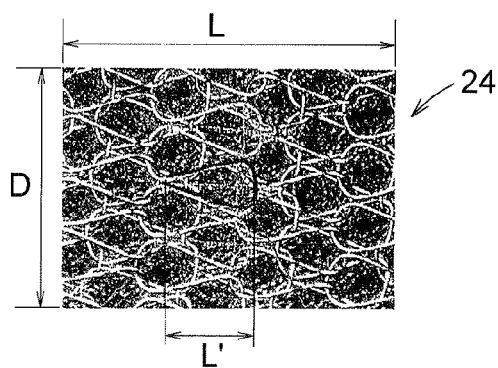
FIG. 14 is an explanatory plan view in the form of a photograph of the outer layer forming member in the process of manufacturing the spherical annular seal member in accordance with the present invention.

Here, the occupying area ratio of the surface 23 constituted by the knitted metal wire net 20 on the outer surface 21 may be determined as follows: Referring to FIG. 14 (plane photograph) illustrating the plane surface of the outer layer forming member 24, an area S1 of fine metal wire portions in an area of a measurement range (length L×width D=S0) is calculated from: (the number of one half of the number of meshes of the hollow cylindrical knitted metal wire net 20 in the circumferential direction)×(the number of meshes with a longitudinal mesh size L' of the knitted metal wire net 20, which are present in the measurement range (length L and width D) of the outer layer forming member 24)×(the length of the fine metal wire net of the knitted metal wire net 20 forming one mesh with that mesh size L')×(the diameter of that fine metal wire). The ratio (S1/S0×100) of the area S1 of the fine metal wire portions occupied in the area of the measurement range (length L×width D=S0) is set as the occupying area ratio of the surface 22. For example, if it is assumed that the number of meshes of the knitted metal wire net 20 in the circumferential direction is 56, that the length L of the measurement range of the outer layer forming member 24 is 20 mm, that the width D of the measurement range of the outer layer forming member 24 is 39 mm, that the longitudinal mesh size L' of one mesh of the knitted metal wire net 20 is 2.01 mm, that the length of the fine metal wire forming that one mesh is 6.43 mm, and that the diameter of that fine metal wire is 0.15 mm, then the area S0 of the measurement range is 780 mm$^2$ (=20 mm×39 mm), and the area of the fine metal wire portions in the measurement range is 56/2×(20/2.01)×6.43×0.15=28× 9.95×6.43×0.15=268.7 mm$^2$, so that the ratio of the area of these metal wire net portions in the unit area becomes 7/780× 100=34.4%. Accordingly, in this outer layer forming member 24, the occupying area ratio of the surface 23 constituted by the knitted metal wire net 20 in the outer surface 21 becomes 34.4%. It should be noted that, with respect to a plurality of measurement ranges of the outer surface 21, the longitudinal mesh size L' of the knitted metal wire net 20 in the outer layer forming member 24 and the length of the fine metal wire forming one mesh with the mesh size L' may be respectively measured by a microscope, and the occupying area ratio may be determined from an arithmetic mean value of the occupying area ratios of the respective measurement ranges obtained by calculation from the measured values.

The fact that, in the outer layer forming member 24, the occupying area ratio of the surface 23 constituted by the knitted metal wire net 20 on the outer surface 21 is set to 30 to 60%, preferably 30 to 45%, produces the effect that although abrasion occurs on the surface 23 constituted by the exposed knitted metal wire net 20 on the outer surface 21 due to sliding friction with the mating member and the occupying area ratio of the surface 23 constituted by the knitted metal wire net 20 increases gradually depending on the amount of abrasion, if the occupying area ratio of the surface 23 constituted by the knitted metal wire net 20 exposed on the outer surface 21 is 30 to 60%, the load applied to each of the expanded graphite sheet 6 and the knitted metal wire net 20 in the sliding friction with the mating member is reduced, with the result that an effect is produced in that even if very small oscillating motions or excessive axial loads are applied continuously for long periods of time, it is possible to prevent as practically as possible the generation of abnormal frictional noise without causing damage to the mating member.

The nip Δ1 between the cylindrical rollers 18 and 19 in the sixth process is preferably set in a range of 0.35 to 0.60 mm.

Figure 15:
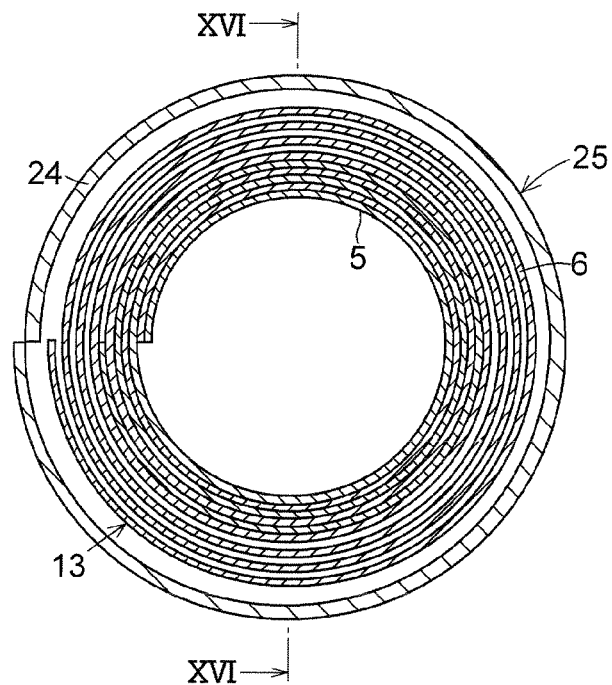
FIG. 15 is an explanatory plan view of a cylindrical preform in the process of manufacturing the spherical annular seal member in accordance with the present invention.
Figure 16:
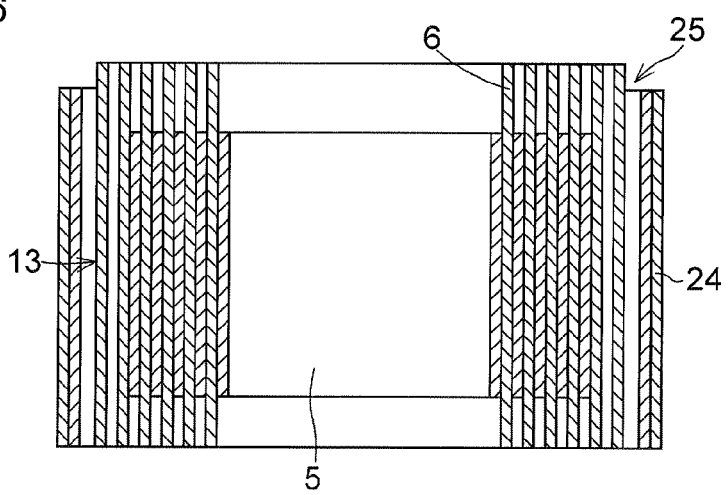
FIG. 16 is an explanatory cross-sectional view, taken in the direction of arrows XVI-XVI, of the cylindrical preform shown in FIG. 15.

(Seventh Process) The outer layer forming member 24 thus obtained is wound around the outer peripheral surface of the aforementioned tubular base member 13 in a state in which the surface 22 where the solid lubricant is exposed is placed on the outer side, thereby fabricating a cylindrical preform 25 (see FIG. 15).

Figure 17:
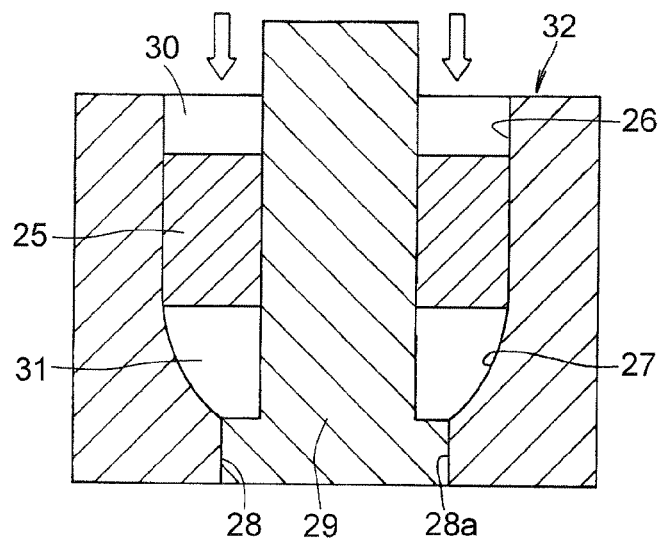
FIG. 17 is an explanatory cross-sectional view of a state in which the cylindrical preform is disposed inside a die in the process of manufacturing the spherical annular seal member in accordance with the present invention.

(Eighth Process) A die 32 such as the one shown in FIG. 17 is prepared which has a cylindrical inner wall surface 26, a partially concave spherical wall surface 27 continuous to the cylindrical inner wall surface 26, and a through hole 28 defined by a small-diameter cylindrical inner wall surface 28a continuous to the partially concave spherical wall surface 27, and in which a hollow cylindrical portion 30 and a spherical annular hollow portion 31 continuous to the hollow cylindrical portion 30 are formed inside it as a stepped core 29 is fittingly inserted in the through hole 28. Then, the cylindrical preform 25 is fitted over the stepped core 29.

The cylindrical preform 25 disposed in the hollow cylindrical portion 30 and the spherical annular hollow portion 31 of the die 32 is subjected to compression forming under a pressure of 98 to 294 N/mm$^2$ (1 to 3 tons/cm$^2$) in the direction of the core axis. Thus, the spherical annular seal member 40 is fabricated which includes: a spherical annular base member 38 defined by a cylindrical inner surface 34 defining a through hole 33 in a central portion, the partially convex spherical surface 35, and the annular end faces 36 and 37 on the large- and small-diameter sides of the partially convex spherical surface 35; and an outer layer 39 formed integrally on the partially convex spherical surface 35 of the spherical annular base member 38, as shown in FIGS. 1 and 2.

Figure 2:
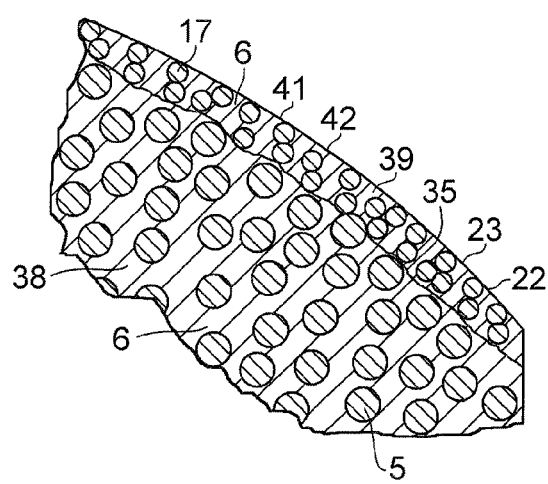
FIG. 2 is a partially enlarged schematic diagram of the spherical annular seal member shown in FIG. 1.

In the spherical annular seal member 40, as shown in FIGS. 1 and 2, the spherical annular base member 38 includes a reinforcing member for the spherical annular base member made from the compressed knitted metal wire net 5 which is knitted by using a fine metal wire with a diameter of 0.28 to 0.32 mm and whose mesh size is 4 to 6 mm long and 3 to 4 mm wide or thereabouts, as well as a heat-resistant material containing the expanded graphite of the expanded graphite sheet 6 compressed in such a manner as to fill the meshes of the knitted metal wire net 5 of this reinforcing member and to be formed integrally with the knitted metal wire net 5 of this reinforcing member in mixed form. The outer layer 39 includes a reinforcing member for the outer layer made from the compressed knitted metal wire net 17 which is knitted by using a fine metal wire with a diameter of 0.10 to 0.20 mm and whose mesh size is 1.0 to 3.0 mm long and 0.5 to 2.5 mm wide or thereabouts, a solid lubricant consisting of a lubricating composition, and a heat-resistant material for the outer layer constituted by the expanded graphite sheet 6 containing the expanded graphite. The solid lubricant and the expanded graphite of the expanded graphite sheet 6 of the heat-resistant material for the outer layer which are compressed in such a manner as to fill the meshes of the compressed knitted metal wire net 17 of the reinforcing member for the outer layer, and the compressed reinforcing member for the outer layer is overlaid on the partially convex spherical surface 35 of the spherical annular base member 38 densely in the radial direction. An outer surface 41 of the outer layer 39 is formed into a smooth composite surface 42 in which the surface 23 constituted by the knitted metal wire net 17 of the reinforcing member for the outer layer and the surface 22 constituted by the solid lubricant are exposed in mixed form. On the outer surface 41 of the outer layer 39, the occupying area ratio of the surface 23 constituted by the knitted metal wire net 17 of the reinforcing member for the outer layer is 30 to 60%.

<Second Manufacturing Method>

The first to seventh processes are identical to those described above.

Figure 18:
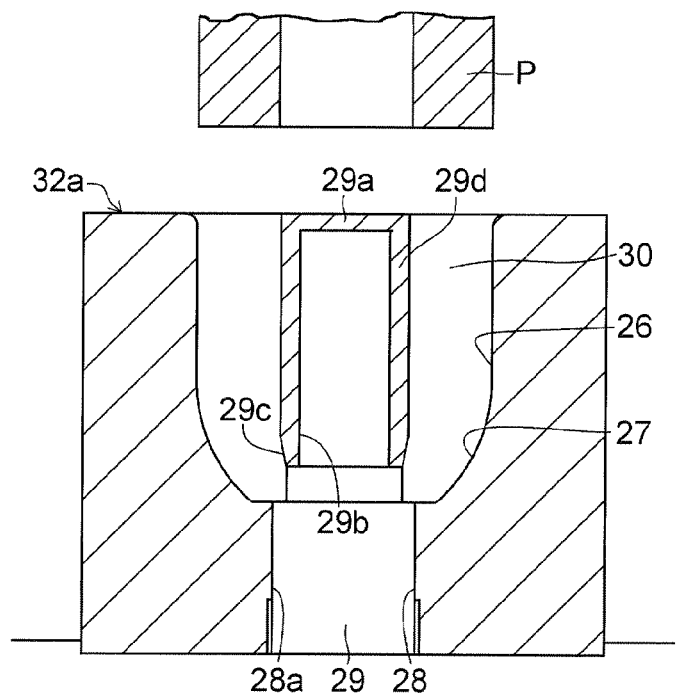
FIG. 18 is an explanatory cross-sectional view of a die in accordance with the other embodiment in the process of manufacturing the spherical annular seal member in accordance with the present invention.
Figure 19:
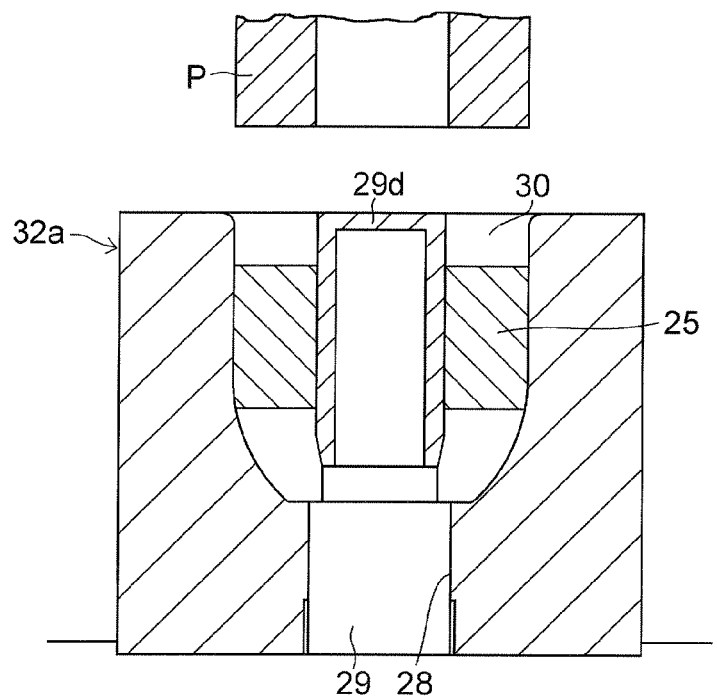
FIG. 19 is an explanatory cross-sectional view of a state in which the cylindrical preform is disposed inside the die shown in FIG. 18, in the process of manufacturing the spherical annular seal member in accordance with the present invention.

(Eighth Process) A stepped core 29 is prepared on one end portion of which is detachably fitted a cap 29d having a bottomed cylindrical shape with a bottom portion 29a provided at one end portion thereof and an opening portion 29b provided at the other end portion thereof, and having on an outer peripheral surface on the opening portion 29b side a truncated conical surface portion 29c which is gradually enlarged in diameter from the other end portion. A die 32a such as the one shown in FIG. 18 is prepared which has the cylindrical inner wall surface 26, the partially concave spherical wall surface 27 continuous to the cylindrical inner wall surface 26, and the through hole 28 defined by the small-diameter cylindrical inner wall surface 28a continuous to the partially concave spherical wall surface 27, and in which the hollow cylindrical portion 30 and the spherical annular hollow portion 31 continuous to the hollow cylindrical portion 30 are formed inside it as the aforementioned stepped core 29 is fittingly inserted in the through hole 28. Then, the cylindrical preform 25 is fitted over the outer peripheral surface of the cap 29d of the stepped core 29, as shown in FIG. 19.

The cylindrical preform 25 disposed in the hollow cylindrical portion 30 and the spherical annular hollow portion 31 of the die 32a is subjected to compression forming by a punch P under a pressure of 98 to 294 N/mm$^2$ (1 to 3 tons/cm$^2$) in the direction of the core axis. Thus, a spherical annular seal member 40a is fabricated which includes: the spherical annular base member 38 having the through hole 33 in its central portion and defined by the cylindrical inner surface 34 having a cylindrical surface 34a, a truncated conical surface 34b continuous to the cylindrical surface 34a, and an enlarged-diameter cylindrical inner surface 34c continuous to the truncated conical surface 34b, the partially convex spherical surface 35, and the annular end faces 36 and 37 on the large- and small-diameter sides of the partially convex spherical surface 35; and the outer layer 39 formed integrally on the partially convex spherical surface 35 of the spherical annular base member 38, as shown in FIG. 3.

Figure 3:
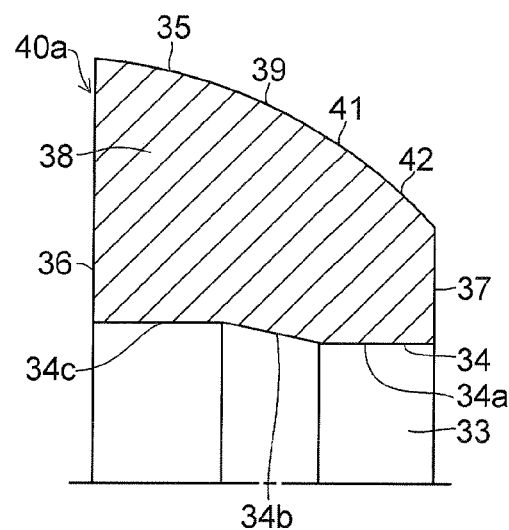
FIG. 3 is an explanatory schematic cross-sectional view of another embodiment of the spherical annular seal member in accordance with the present invention.

In the spherical annular seal member 40a, as shown in FIGS. 2 and 3, the spherical annular base member 38 includes a reinforcing member for the spherical annular base member made from the compressed knitted metal wire net 5 which is knitted by using a fine metal wire with a diameter of 0.28 to 0.32 mm and whose mesh size is 4 to 6 mm long and 3 to 4 mm wide or thereabouts, as well as a heat-resistant material containing the expanded graphite of the expanded graphite sheet 6 compressed in such a manner as to fill the meshes of the knitted metal wire net 5 of this reinforcing member and to be formed integrally with the knitted metal wire net 5 of this reinforcing member in mixed form. The outer layer 39 includes a reinforcing member for the outer layer made from the compressed knitted metal wire net 17 which is knitted by using a fine metal wire with a diameter of 0.10 to 0.20 mm and whose mesh size is 1.0 to 3.0 mm long and 0.5 to 2.5 mm wide or thereabouts, a solid lubricant consisting of a lubricating composition, and a heat-resistant material for the outer layer constituted by the expanded graphite sheet 6 containing the expanded graphite. The solid lubricant and the expanded graphite of the expanded graphite sheet 6 of the heat-resistant material for the outer layer which are compressed in such a manner as to fill the meshes of the compressed knitted metal wire net 17 of the reinforcing member for the outer layer, and the reinforcing member for the outer layer is overlaid on the partially convex spherical surface 35 of the spherical annular base member 38 densely in the radial direction. The outer surface 41 of the outer layer 39 is formed into the composite surface 42 in which the surface 23 constituted by the knitted metal wire net 17 of the reinforcing member for the outer layer and the surface 22 constituted by the solid lubricant are exposed in mixed form. On the outer surface 41 of the outer layer 39, the occupying area ratio of the surface 23 constituted by the knitted metal wire net 17 of the reinforcing member for the outer layer is 30 to 60%. The cylindrical inner surface 34 defining the through hole 33 includes the cylindrical surface 34a having a predetermined width in a direction from the small-diameter side annular end face 37 toward the large-diameter side annular end face 36 of the spherical annular base member 38, the truncated conical surface 34b whose diameter is gradually increased from an end of the cylindrical surface 34a toward the large-diameter side annular end face 36 of the spherical annular base member 38 and which has a predetermined width in a direction from the end of the cylindrical surface 34a toward the large-diameter side annular end face 36, and the enlarged-diameter cylindrical inner surface 34c having a predetermined width in a direction from an end of the truncated conical surface 34b toward the large-diameter side annular end face 36 and having a diameter corresponding to the outside diameter of a pipe end portion 101 (see FIG. 20) of an exhaust pipe 100, the cylindrical inner surface 34 having a surface in which the reinforcing member made from the compressed metal wire net of the spherical annular base member 38 is exposed to the outside. The cylindrical surface 34a is formed with an identical diameter between its both ends and is continuously connected to the small-diameter side annular end face 37 of the spherical annular base member 38; the truncated conical surface 34b is continuously connected at its small-diameter side end to the other end of the cylindrical surface 34a and is continuously connected at its large-diameter side end to one end of the enlarged-diameter cylindrical inner surface 34c; and the enlarged-diameter cylindrical inner surface 34c is continuously connected at its other end to the large-diameter side annular end face 36 of the spherical annular base member 38 and is formed with an identical diameter between its both ends. On the annular end faces 36 and 37, the heat-resistant material constituted by the expanded graphite of the expanded graphite sheet 6, which is formed by compressing, bending, and spreading those portions (portions of δ2 and δ1) of the expanded graphite sheet 6 that project from the knitted metal wire net 5 in the widthwise direction, is exposed to the outside.

Figure 20:
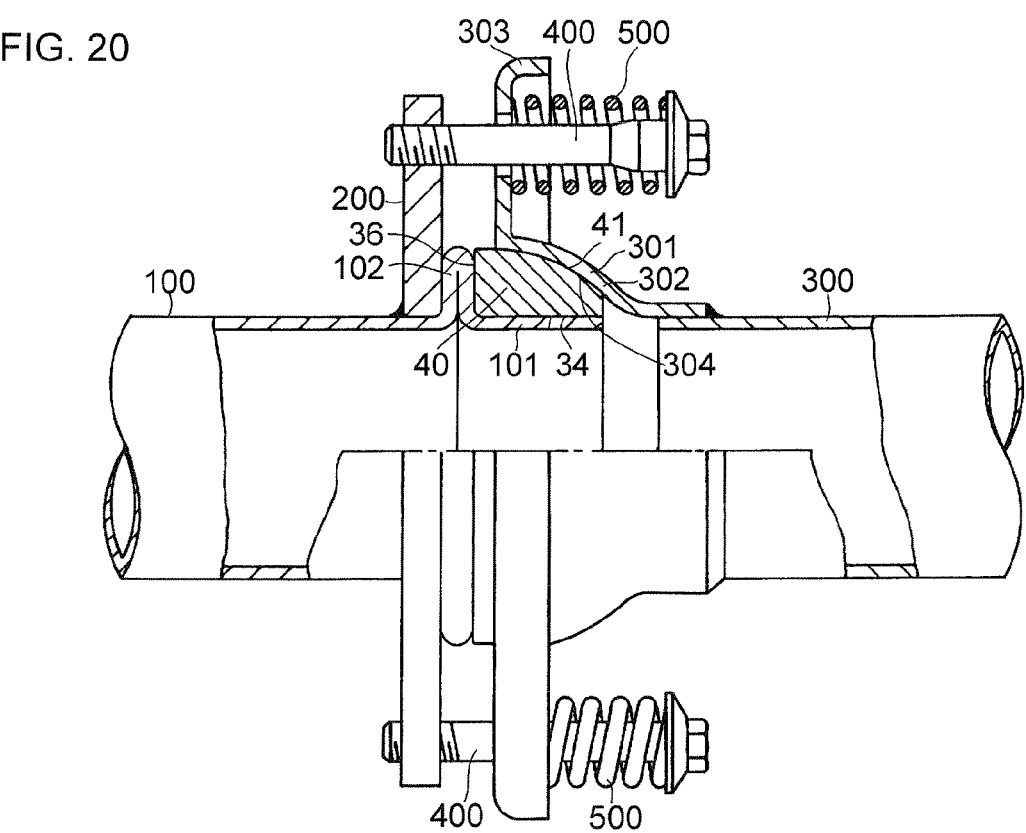
FIG. 20 is an explanatory cross-sectional view of an exhaust pipe spherical joint incorporating the spherical annular seal member in accordance with the present invention.
Figure 21:
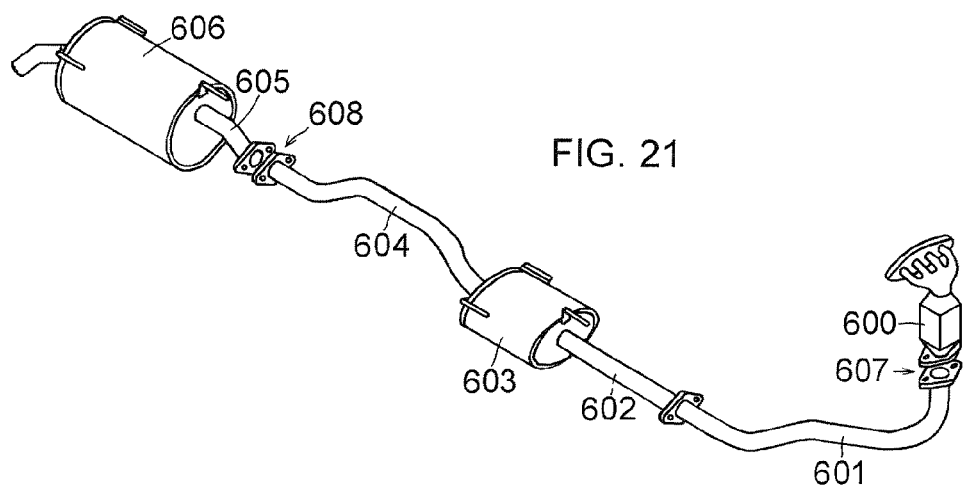
FIG. 21 is an explanatory diagram of an exhaust system of an automobile engine.

The spherical annular seal members 40 and 40a are each used by being incorporated in the exhaust pipe spherical joint shown in FIG. 20. That is, in the exhaust pipe spherical joint shown in FIG. 20, a flange 200, which includes a flange portion 102 formed integrally on an upstream-side exhaust pipe 100 by leaving a pipe end portion 101, is provided uprightly on an outer peripheral surface of the upstream-side exhaust pipe 100 which is connected to the engine side. The spherical annular seal member 40 is fitted over the pipe end portion 101 at the cylindrical inner surface 34 defining the through hole 33, and is seated with its large-diameter side annular end face 36 abutting against the flange portion 102 of the flange 200. A flared portion 301, which integrally has a concave spherical surface portion 302 and a flange portion 303 continuous from the concave spherical surface portion 302, is secured to a downstream-side exhaust pipe 300 disposed in such a manner as to oppose the upstream-side exhaust pipe 100 and is connected to the muffler side. An inner surface 304 of the concave spherical surface portion 302 is in slidable contact with the smooth composite surface 42 in which the surface 23 constituted by the knitted metal wire net 17 of the reinforcing member and the surface 22 constituted by the solid lubricant are present in mixed form in the outer surface 41 of the outer layer 39 of the spherical annular seal member 40.

In the exhaust pipe spherical joint shown in FIG. 20, the downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between an enlarged head of the bolt 400 and the flange portion 303. Further, the exhaust pipe spherical joint is arranged such that relative angular displacements occurring in the upstream- and downstream-side exhaust pipes 100 and 300 are allowed by sliding contact between the smooth composite surface 42 serving as a sliding surface of the outer layer 39 of the spherical annular seal member 40 and the inner surface 304 of the concave spherical surface portion 302 of the flared portion 301 formed at the end of the downstream-side exhaust pipe 300.

EXAMPLES

Example 1

By using one austenitic stainless steel wire (SUS 304) with a diameter of 0.28 mm as a fine metal wire, a hollow cylindrical knitted metal wire net whose mesh size was 5 mm long and 4 mm wide was fabricated and was passed between a pair of rollers, thereby preparing a belt-shaped knitted metal wire net serving as the reinforcing member for the spherical annular base member. This belt-shaped metal wire net and the expanded graphite sheet I having a density of 1.12 Mg/m$^3$ and a thickness of 0.38 mm were superposed one on top of the other to form a superposed assembly. The superposed assembly was then convoluted with the belt-shaped knitted metal wire net placed on the inner side such that the belt-shaped knitted metal wire net was convoluted by five turns and the expanded graphite sheet I was convoluted by six turns, thereby preparing a tubular base member in which the expanded graphite sheet I was placed on the outermost periphery. In this tubular base member, widthwise opposite end portions of the expanded graphite sheet I respectively projected from the belt-shaped knitted metal wire net in the widthwise direction of the belt-shaped knitted metal wire net.

An expanded graphite sheet I similar to the above-described expanded graphite sheet I and having a density of 1.12 Mg/m$^3$ and a thickness of 0.38 mm was separately prepared, and an alumina sol was prepared in which, as hydrated alumina, boehmite (alumina monohydrate: $Al_2O_3 \cdot H_2O$) was dispersedly contained in water serving as a dispersion medium containing nitric acid acting as a deflocculant and whose hydrogen ion concentration (pH) exhibited 2. An aqueous dispersion (22.5% by mass of h-BN, 25.0% by mass of PTFE, and 2.5% by mass of boehmite), in which h-BN and PTFE were dispersedly contained in this alumina sol and which dispersedly contained as a solid content 50% by mass of a lubricating composition containing 45.0% by mass of h-BN, 50.0% by mass of PTFE, and 5.0% by mass of boehmite, was roller coated on one surface of the expanded graphite sheet I and was dried to form on one surface of the expanded graphite sheet I a coating layer of the solid lubricant (45.0% by mass of h-BN, 50.0% by mass of PTFE, and 5.0% by mass of boehmite) consisting of the lubricating composition, thereby fabricating a multilayer sheet composed of the expanded graphite sheet I and the coating layer of the solid lubricant coating one surface of this expanded graphite sheet I.

By using one austenitic stainless steel wire (SUS 304) with a diameter of 0.15 mm as a fine metal wire, a hollow cylindrical knitted metal wire net serving as the reinforcing member for the outer layer whose mesh size was 2.01 mm long and 0.70 mm wide (measured by a microscope) was continuously knitted, and the aforementioned multilayer sheet was continuously inserted between two layers of the interior of that hollow cylindrical knitted metal wire net. This hollow cylindrical knitted metal wire net with the multilayer sheet inserted between the two layers was fed, starting with the insertion start end of the multilayer sheet, into a nip between a pair of cylindrical rollers so as to be pressurized in the thicknesswise direction of the multilayer sheet, thereby deforming the hollow cylindrical knitted metal wire net into a flattened knitted metal wire net. The multilayer sheet and the flattened knitted metal wire net were thus integrated by being pressure bonded to each other such that the expanded graphite of the expanded graphite sheet I of the multilayer sheet was filled in the meshes of that knitted metal wire net, and portions of the knitted metal wire net and the solid lubricant of the coating layer of the multilayer sheet were both exposed on the outer surface, while the other portions of the knitted metal wire net were embedded in the coating layer and the expanded graphite sheet of the multilayer sheet. Thus, an outer layer forming member was fabricated in which the occupying area ratio of the surface constituted by the knitted metal wire net on the outer surface was 34.5%, and on the outer surface of which a surface constituted by the knitted metal wire net and a surface constituted by the solid lubricant of the coating layer were exposed in mixed form.

The outer layer forming member, in a state in which its surface where the solid lubricant was exposed was placed on the outer side, was wound around the outer peripheral surface of the aforementioned tubular base member, thereby fabricating a cylindrical preform.

This cylindrical preform was fitted over the stepped core of the die shown in FIG. 17, and was disposed in the hollow portion inside the die.

The cylindrical preform disposed in the hollow cylindrical portion of the die was subjected to compression forming under a pressure of 294 N/mm$^2$ (3 tons/cm$^2$) in the direction of the core axis. Thus, a spherical annular seal member was fabricated which included: a spherical annular base member defined by a cylindrical inner surface defining a through hole in the central portion and constituted by an exposed surface where the belt-shaped knitted metal wire net serving as the reinforcing member for the spherical annular base member was exposed, a partially convex spherical surface, and annular end faces on the large- and small-diameter sides of the partially convex spherical surface; and an outer layer formed integrally on the partially convex spherical surface.

In the spherical annular seal member thus obtained, the spherical annular base member included the reinforcing member for the spherical annular base member made from the compressed knitted metal wire net which was knitted by using a fine metal wire with a diameter of 0.28 mm and whose mesh size was 5 mm long and 4 mm wide, as well as the heat-resistant material containing expanded graphite and compressed in such a manner as to fill the meshes of the knitted metal wire net of this reinforcing member and to be formed integrally with the knitted metal wire net of this reinforcing member in mixed form. The outer layer included the reinforcing member for the outer layer made from the compressed knitted metal wire net which was knitted by using a fine metal wire with a diameter of 0.15 mm and whose mesh size was 2.01 mm long and 0.70 mm wide, the solid lubricant consisting of a lubricating composition, and the heat-resistant material for the outer layer containing expanded graphite. The solid lubricant and the heat-resistant material for the outer layer which were compressed in such a manner as to fill the meshes of the knitted metal wire net of the reinforcing member for the outer layer, and the reinforcing member for the outer layer was overlaid on the partially convex spherical surface of the spherical annular base member densely in the radial direction. The outer surface of that outer layer was formed into a smooth composite surface in which the surface constituted by the reinforcing member for the outer layer and the surface constituted by the solid lubricant were exposed in mixed form. On the outer surface of that outer layer, the occupying area ratio of the surface constituted by the reinforcing member for the outer layer was 34.5%.

Example 2

A tubular base member was fabricated in the same way as in Example 1 described above. In this tubular base member, widthwise opposite end portions of the expanded graphite sheet I respectively projected from the belt-shaped knitted metal wire net serving as a reinforcing member of a spherical annular base member in the widthwise direction thereof.

An aqueous dispersion similar to that of Example 1 described above was roller coated on one surface of the expanded graphite sheet I and was dried to form on one surface of the expanded graphite sheet I a coating layer of the solid lubricant (45.0% by mass of h-BN, 50.0% by mass of PTFE, and 5.0% by mass of boehmite) consisting of the lubricating composition, thereby fabricating a multilayer sheet composed of the expanded graphite sheet I and the coating layer of the solid lubricant coating one surface of this expanded graphite sheet I.

By using as a fine metal wire one austenitic stainless steel wire similar to that of Example 1 described above and having a diameter of 0.15 mm, a hollow cylindrical knitted metal wire net serving as the reinforcing member for the outer layer whose mesh size was 1.24 mm long and 0.64 mm wide (measured by a microscope) was continuously knitted, and the aforementioned multilayer sheet was continuously inserted between two layers of the interior of that hollow cylindrical knitted metal wire net. This hollow cylindrical knitted metal wire net with the multilayer sheet inserted was fed, starting with the insertion start end of the multilayer sheet, into a nip between a pair of cylindrical rollers so as to be pressurized in the thicknesswise direction of the multilayer sheet, thereby deforming the hollow cylindrical knitted metal wire net into a flattened knitted metal wire net. The multilayer sheet and the knitted metal wire net were thus integrated by being pressure bonded to each other such that the expanded graphite of the expanded graphite sheet I of the multilayer sheet was filled in the meshes of that knitted metal wire net, and portions of the knitted metal wire net and the expanded graphite of the expanded graphite sheet I of the multilayer sheet were both exposed on the outer surface, while the other portions of the knitted metal wire net were embedded in the coating layer and the expanded graphite sheet I of the multilayer sheet. Thus, an outer layer forming member was fabricated in which the occupying area ratio of the surface constituted by the knitted metal wire net on the outer surface was 42.1%, and on the outer surface of which a surface constituted by the knitted metal wire net and a surface constituted by the solid lubricant were exposed in mixed form.

The outer layer forming member, in a state in which its surface where the solid lubricant was exposed was placed on the outer side, was wound around the outer peripheral surface of the aforementioned tubular base member, thereby fabricating a cylindrical preform. Thereafter, in a method similar to that of Example 1, a spherical annular seal member was fabricated which included: a spherical annular base member defined by a cylindrical inner surface defining a through hole in the central portion and constituted by an exposed surface where the belt-shaped knitted metal wire net serving as the reinforcing member for the spherical annular base member was exposed, a partially convex spherical surface, and annular end faces on the large- and small-diameter sides of the partially convex spherical surface; and an outer layer formed integrally on the partially convex spherical surface of the spherical annular base member.

In the spherical annular seal member thus obtained, the spherical annular base member included the reinforcing member for the spherical annular base member made from the compressed knitted metal wire net which was knitted by using a fine metal wire with a diameter of 0.28 mm and whose mesh size was 5 mm long and 4 mm wide, as well as the heat-resistant material containing expanded graphite and compressed in such a manner as to fill the meshes of the knitted metal wire net of this reinforcing member and to be formed integrally with the knitted metal wire net of this reinforcing member in mixed form. The outer layer included the reinforcing member for the outer layer made from the compressed knitted metal wire net which was knitted by using a fine metal wire with a diameter of 0.15 mm and whose mesh size was 1.24 mm long and 0.64 mm wide, the solid lubricant consisting of a lubricating composition, and the heat-resistant material for the outer layer containing expanded graphite. The solid lubricant and the heat-resistant material for the outer layer which were compressed in such a manner as to fill the meshes of the knitted metal wire net of the reinforcing member for the outer layer, and the reinforcing member for the outer layer was overlaid on the partially convex spherical surface of the spherical annular base member densely in the radial direction. The outer surface of that outer layer was formed into a smooth composite surface in which the surface constituted by the reinforcing member for the outer layer and the surface constituted by the solid lubricant were exposed in mixed form. On the outer surface of that outer layer, the occupying area ratio of the surface constituted by the reinforcing member for the outer layer was 42.1%.

Example 3

A spherical annular seal member was fabricated by using component materials similar to those of Example 2 described above and a method similar to that of Example 1 described above except that an expanded graphite sheet III containing 1.0% by mass of phosphorus pentoxide, 4.0% by mass of aluminum primary phosphate, and expanded graphite and having a density of 1.12 Mg/m³ and a thickness of 0.38 mm was used as the expanded graphite sheet of each heat-resistant material in Example 2 described above.

In the spherical annular seal member thus obtained, the spherical annular base member included the reinforcing member for the spherical annular base member made from the compressed knitted metal wire net which was knitted by using a fine metal wire with a diameter of 0.28 mm and whose mesh size was 5 mm long and 4 mm wide, as well as the heat-resistant material containing 4.0% by mass of aluminum primary phosphate, 1.0% by mass of phosphorus pentoxide, and expanded graphite and compressed in such a manner as to fill the meshes of the knitted metal wire net of this reinforcing member and to be formed integrally with the knitted metal wire net of this reinforcing member in mixed form. The outer layer included the reinforcing member for the outer layer made from the compressed knitted metal wire net which was knitted by using a fine metal wire with a diameter of 0.15 mm and whose mesh size was 1.24 mm long and 0.64 mm wide, the solid lubricant consisting of a lubricating composition, and the heat-resistant material for the outer layer containing 4.0% by mass of aluminum primary phosphate, 1.0% by mass of phosphorus pentoxide, and expanded graphite. The solid lubricant and the heat-resistant material for the outer layer which were compressed in such a manner as to fill the meshes of the knitted metal wire net of the reinforcing member for the outer layer, and the reinforcing member for the outer layer was overlaid on the partially convex spherical surface of the spherical annular base member densely in the radial direction. The outer surface of that outer layer was formed into a smooth composite surface in which the surface constituted by the reinforcing member for the outer layer and the surface constituted by the solid lubricant were exposed in mixed form. On the outer surface of that outer layer, the occupying area ratio of the surface constituted by the reinforcing member for the outer layer was 42.1%.

Comparative Example 1 (Corresponding to Example 3 in Patent Document 1 )

By using one austenitic stainless steel wire (SUS 304) with a diameter of 0.28 mm as a fine metal wire, a hollow cylindrical knitted metal wire net whose mesh size was 5 mm long and 4 mm wide was fabricated and was passed between a pair of rollers to form a belt-shaped knitted metal wire net, and this was used as the reinforcing member for the spherical annular base member. As the expanded graphite sheet serving as the heat-resistant material for the spherical annular base member, the expanded graphite sheet I having a density of 1.12 Mg/m³ and a thickness of 0.38 mm was used, and this expanded graphite sheet I and the belt-shaped knitted metal wire net were superposed one on top of the other to form a superposed assembly. This superposed assembly was then convoluted with the belt-shaped knitted metal wire net placed on the inner side and such that the belt-shaped knitted metal wire net was convoluted by five turns and the expanded graphite sheet I was convoluted by six turns, thereby fabricating a tubular base member in which the expanded graphite sheet I was placed on the outermost periphery. In this tubular base member, widthwise opposite end portions of the expanded graphite sheet I respectively projected from the belt-shaped knitted metal wire net, serving as the reinforcing member for the spherical annular base member, in the widthwise direction thereof.

As the heat-resistant material for the outer layer, the expanded graphite sheet I having a density of 0.3 Mg/m³ and a thickness of 1.35 mm was used. As the reinforcing member for the outer layer, a hollow cylindrical knitted metal wire net was used which was continuously knitted by using an austenitic stainless steel wire (SUS 304) with a diameter of 0.15 mm and whose mesh size was 3.5 mm long and 2.5 mm wide, and the expanded graphite sheet I serving as the heat-resistant material for the outer layer was continuously inserted into the interior of that hollow cylindrical knitted metal wire net. The hollow cylindrical knitted metal wire net with that expanded graphite sheet I inserted therein was fed, starting with the insertion start end of the expanded graphite sheet I, into a nip (the nip Δ1 was set to 0.5 mm) between a cylindrical roller and a roller having on its outer peripheral surface a plurality of annular recessed grooves along the axial direction, so as to be pressurized in the thicknesswise direction of the expanded graphite sheet I, and was further fed into a nip (this nip Δ2 was set to 0.45 mm) between another pair of cylindrical rollers so as to be pressurized. Thus, a composite sheet for the outer layer was fabricated in which the expanded graphite sheet and the knitted metal wire net were pressure bonded to each other such that the expanded graphite of the expanded graphite sheet I was tightly filled in the meshes of the knitted metal wire net flattened by pressurization, and the knitted metal wire net was embedded in the expanded graphite sheet I, whereby the surface of the expanded graphite sheet I and the surface constituted by the knitted metal wire net were made flush with each other, and the surface constituted by the knitted metal wire net and the surface constituted by the expanded graphite of the expanded graphite sheet I were exposed on the outer surface in a dotted manner.

As the lubricating composition, an aqueous dispersion similar to that of Example 1 described above was used (an aqueous dispersion which dispersedly contained as a solid content 50% by mass of a lubricating composition containing 45.0% by mass of h-BN, 50.0% by mass of PTFE, and 5.0% by mass of boehmite). This aqueous dispersion was roller coated on the surface of that composite sheet on the side which was pressurized by the aforementioned roller having the annular recessed grooves, and was then dried, thereby fabricating a multilayer sheet for the outer layer in which a coating layer of the solid lubricant (45.0% by mass of h-BN, 50.0% by mass of PTFE, and 5.0% by mass of boehmite) consisting of the lubricating composition was formed on one surface of that composite sheet.

The multilayer sheet for the outer layer with its coating layer facing the outside was wound around the outer peripheral surface of the aforementioned tubular base member, thereby fabricating a cylindrical preform. Thereafter, by a method similar to that of Example 1 described above, a spherical annular seal member was fabricated which included: a spherical annular base member defined by a cylindrical inner surface defining a through hole in the central portion, a partially convex spherical surface, and annular end faces on the large- and small-diameter sides of the partially convex spherical surface; and an outer layer formed integrally on the partially convex spherical surface of the spherical annular base member.

Figure 22:
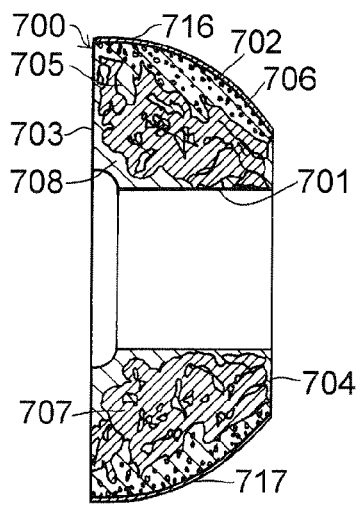
FIG. 22 is an explanatory cross-sectional view illustrating a conventional spherical annular seal member.
Figure 23:
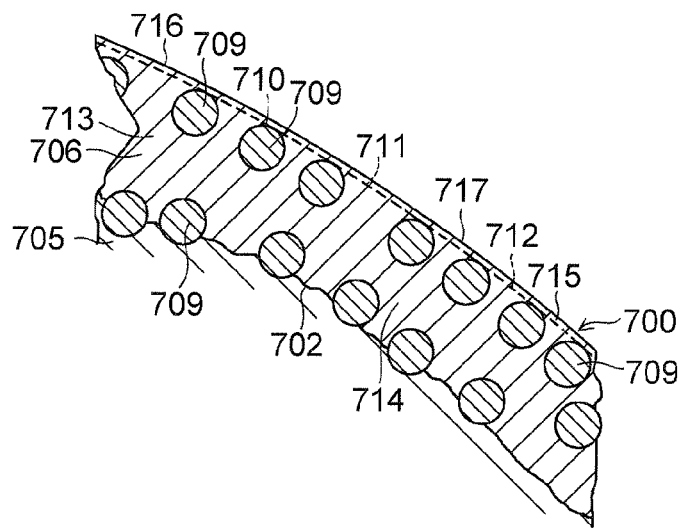
FIG. 23 is a partially enlarged explanatory cross-sectional view of the spherical annular seal member shown in FIG. 22.

In the spherical annular seal member thus obtained, the spherical annular base member included the heat-resistant material for the spherical annular base member containing compressed expanded graphite and the reinforcing member for the spherical annular base member made from the compressed knitted metal wire net, which was knitted by using a fine metal wire with a diameter of 0.28 mm and whose mesh size was 5 mm long and 4 mm wide, the reinforcing member for the spherical annular base member having structural integrity by being intertwined with the compressed expanded graphite sheet I of the heat-resistant material for the spherical annular base member. The outer layer included the reinforcing member for the outer layer made from the compressed knitted metal wire net which was knitted by using a fine metal wire with a diameter of 0.15 mm and whose mesh size was 3.5 mm long and 2.5 mm wide, the heat-resistant material made from the expanded graphite sheet I compressed in such a manner as to fill the meshes of the knitted metal wire net of that reinforcing member, and the solid lubricant of the coating layer, the smooth outer layer being constituted by the solid lubricant of the coating layer (see FIGS. 22 and 23).

Comparative Example 2 (Corresponding to Example 11 in Patent Document 2)

A belt-shaped knitted metal wire net similar to that of Comparative Example 1 described above was used as the reinforcing member for the spherical annular base member. As the expanded graphite sheet serving as the heat-resistant material for the spherical annular base member, the expanded graphite sheet III was used which contained 1.0% by mass of phosphorus pentoxide, 4.0% by mass of aluminum primary phosphate, and expanded graphite and had a density of 1.12 $Mg/m^3$ and a thickness of 0.38 mm. A superposed assembly of this expanded graphite sheet III and the belt-shaped knitted metal wire net was convoluted such that the expanded graphite sheet III was placed on the outermost periphery, to thereby fabricate a tubular base member. In this tubular base member, widthwise opposite end portions of the expanded graphite sheet III respectively projected from the belt-shaped metal wire net, serving as the reinforcing member for the spherical annular base member, in the widthwise direction thereof.

As the heat-resistant material for the outer layer, the expanded graphite sheet III was used which contained 1.0% by mass of phosphorus pentoxide, 4.0% by mass of aluminum primary phosphate, and expanded graphite and had a density of 0.3 $Mg/m^3$ and a thickness of 1.35 mm. As the reinforcing member for the outer layer, a hollow cylindrical knitted metal wire net was used which was continuously knitted by using an austenitic stainless steel wire (SUS 304) similar to that of Comparative Example 1 described above and having a diameter of 0.15 mm, and whose mesh size was 3.5 mm long and 2.5 mm wide. The expanded graphite sheet III serving as the heat-resistant material for the outer layer was continuously inserted into the interior of that hollow cylindrical knitted metal wire net. Thereafter, in a method similar to that of Example 1, a composite sheet for the outer layer was fabricated in which the surface of the expanded graphite sheet III serving as the heat-resistant material for the outer layer and constituted by 1.0% by mass of phosphorus pentoxide, aluminum primary phosphate, and expanded graphite and the surface of the expanded graphite sheet III constituted by 1.0% by mass of phosphorus pentoxide, aluminum primary phosphate, and expanded graphite were exposed in dotted form.

In the same way as in Comparative Example 1 described above, a multilayer sheet for the outer layer was fabricated in which a coating layer of the solid lubricant (45.0% by mass of h-BN, 50.0% by mass of PTFE, and 5.0% by mass of boehmite) was formed on one surface of the composite sheet for the outer layer.

The multilayer sheet for the outer layer with its coating layer facing the outside was wound around the outer peripheral surface of the aforementioned tubular base member, thereby fabricating a cylindrical preform. Thereafter, in the same way as Example 1 described above, a spherical annular seal member was fabricated which included: a spherical annular base member defined by a cylindrical inner surface defining a through hole in the central portion, a partially convex spherical surface, and annular end faces on the large- and small-diameter sides of the partially convex spherical surface; and an outer layer formed integrally on the partially convex spherical surface of the spherical annular base member.

In the spherical annular seal member thus obtained, the spherical annular base member included the heat-resistant material constituted by the compressed expanded graphite sheet III containing 1.0% by mass of phosphorus pentoxide, 4.0% by mass of aluminum primary phosphate and expanded graphite and the reinforcing member for the spherical annular base member made from the knitted metal wire net, which was knitted by using a fine metal wire with a diameter of 0.28 mm and whose mesh size was 5 mm long and 4 mm wide, the reinforcing member for the spherical annular base member having structural integrity by being intertwined with the compressed expanded graphite sheet III. The outer layer included the reinforcing member for the outer layer made from the compressed knitted metal wire net which was knitted by using a fine metal wire having a diameter of 0.15 mm, and whose mesh size was 3.5 mm long and 2.5 mm wide, the heat-resistant material made from the expanded graphite sheet III compressed in such a manner as to fill the meshes of the knitted metal wire net of that reinforcing member, and the solid lubricant of the coating layer, the outer surface of the outer layer formed smooth being constituted by the solid lubricant of the coating layer.

Next, a description will be given of the results of tests conducted on the presence or absence of generation of abnormal frictional noise, the amount of gas leakage (1/min), and the amount of abrasion by incorporating the spherical annular seal members obtained in Examples 1 to 3 and Comparative Examples 1 and 2 described above into the exhaust pipe spherical joint shown in FIG. 20.

<Test Conditions on Presence or Absence of Generation of Abnormal Frictional Noise>
   Pressing force using coil springs (spring set force): 1177 N
   Oscillation angle: ±3°
   Excitation frequency: 12 Hz
   Temperature (outer surface temperature of the concave spherical surface portion 302 shown in FIG. 20): from room temperature (25° C.) to 500° C.
   No. of test oscillations: 8 cycles (2,000,000 oscillations)
   Mating member (material of the flared portion 301 shown in FIG. 20): SUS 304

<Test Method and Measurement Method>
After 45,000 oscillating motions are performed at room temperature (25° C.) by setting an oscillating motion at ±3° at an excitation frequency of 12 Hz as a unit of oscillation, the ambient temperature is raised to 500° C., while continuing the oscillating motions (the number of oscillating motions during the temperature rise being 45,000). When the ambient temperature reached the temperature of 500° C., 115,000 oscillating motions are performed, and the ambient temperature is subsequently allowed to drop to room temperature while continuing the oscillating motions (the number of oscillating motions during the temperature drop being 45,000). A combined total of 250,000 oscillating motions is set as one cycle, and 8 cycles (2,000,000 oscillations) are performed.

The evaluation of the presence or absence of the occurrence of abnormal frictional noise was conducted at the aforementioned points in time, i.e., (1) after 500,000 oscillating motions, (2) after 1,000,000 oscillating motions, (3) after 1,500,000 oscillating motions, and (4) after 2,000,000 oscillating motions, by using the following judgment levels.

<Judgment Levels of Abnormal Frictional Noise>
   Code 0: No abnormal frictional noise is generated.
   Code 0.5: The generation of abnormal frictional noise can be confirmed by a sound collection pipe.
   Code 1: The generation of abnormal frictional noise can be confirmed at a position approx. 0.2 m away from the sliding portion of the exhaust pipe spherical joint.
   Code 1.5: The generation of abnormal frictional noise can be confirmed at a position approx. 0.5 m away from the sliding portion of the exhaust pipe spherical joint.
   Code 2: The generation of abnormal frictional noise can be confirmed at a position approx. 1 m away from the sliding portion of the exhaust pipe spherical joint.
   Code 2.5: The generation of abnormal frictional noise can be confirmed at a position approx. 2 m away from the sliding portion of the exhaust pipe spherical joint.
   Code 3: The generation of abnormal frictional noise can be confirmed at a position approx. 3 m away from the sliding portion of the exhaust pipe spherical joint.
   Code 3.5: The generation of abnormal frictional noise can be confirmed at a position approx. 5 m away from the sliding portion of the exhaust pipe spherical joint.
   Code 4: The generation of abnormal frictional noise can be confirmed at a position approx. 10 m away from the sliding portion of the exhaust pipe spherical joint.
   Code 4.5: The generation of abnormal frictional noise can be confirmed at a position approx. 15 m away from the sliding portion of the exhaust pipe spherical joint.
   Code 5: The generation of abnormal frictional noise can be confirmed at a position approx. 20 m away from the sliding portion of the exhaust pipe spherical joint.

In the overall assessment of the above-described determination levels, with respect to Codes 0 to 2.5 a determination was made that no abnormal frictional noise was generated (accepted), whereas with respect to Codes 3 to 5 a determination was made that abnormal frictional noise was generated (rejected).

In addition, measurement was made of the amount of abrasion of the outer layer of the spherical annular seal member according to each of Examples 1 to 3 and Comparative Examples 1 and 2 upon completion of 2,000,000 test oscillations under the above-described test conditions.

<Test Conditions of Gas Leakage Amount>
   Pressing force using coil springs (spring set force): 588 N
   Excitation angle: ±3°
   Excitation frequency (oscillation velocity): 1.6 Hz
   Temperature (outer surface temperature of the concave spherical surface portion 302 shown in FIG. 20): from room temperature (25° C.) to 500° C.
   Number of oscillating motions: 2,000,000
   Mating member (material of the flared portion 301 shown in FIG. 20): SUS 304

<Test Method>
The temperature was raised up to 500° C. while continuing the oscillating motion at ±3° at an excitation frequency of 1.6 Hz at room temperature. In a state in which that temperature was held, the oscillating motion was continued, and the amount of gas leakage was measured at the point of time when the number of oscillating motions reached 1,000,000 and 2,000,000.

<Measurement Method of Gas Leakage Amount>
An opening portion of the upstream-side exhaust pipe 100 of the exhaust pipe spherical joint shown in FIG. 20 was closed, and dry air was allowed to flow from the downstream-side exhaust pipe 300 side under a pressure of 49 kPa (0.5 kgf/cm$^2$). The amount of gas leakage from the joint portion (sliding contact portions between the outer surface 41 of the spherical annular seal member 40 and the inner surface 304 of the flared portion 301, fitting portions between the cylindrical inner surface 34 of the spherical annular seal member 40 and the pipe end portion 101 of the upstream-side exhaust pipe 100, and abutting portions between the large-diameter side annular end face 36 of the spherical annular base member 38 of the spherical annular seal member 40 and the flange portion 102 provided uprightly on the upstream-side exhaust pipe 100) in a stationary neutral state and in an excited state was measured by means of a flowmeter, (1) at an early period of test (before start), (2) after 1,000,000 oscillating motions, and (3) after 2,000,000 oscillating motions.

Table 1 shows the results of the above-described tests.

TABLE 1

|  |  |  | Examples | | | Comparative Examples | |
| --- | --- | --- | --- | --- | --- | --- | --- |
|  |  |  | 1 | 2 | 3 | 1 | 2 |
| Determination of abnormal frictional noise | No. of oscillating motions: | 500,000 | 1.5 | 1.5 | 1.5 | 1.5 | 1 |
|  |  | 1,000,000 | 1.5 | 1.5 | 1.5 | 2 | 1 |
|  |  | 1,500,000 | 1.5 | 1.5 | 1 | 3.5 | 3.5 |
|  |  | 2,000,000 | 1 | 1 | 1 | 3 | 3 |
|  | Overall judgment | | accepted | accepted | accepted | rejected | rejected |
| Amount of gas leakage | Stationary neutral state | (1) | 0.12 | 0.10 | 0.09 | 0.12 | 0.06 |
|  |  | (2) | 0.12 | 0.12 | 0.09 | 0.12 | 0.08 |
|  |  | (3) | 0.10 | 0.10 | 0.08 | 0.16 | 0.12 |
|  | Oscillated state | (1) | 0.24 | 0.22 | 0.20 | 0.20 | 0.22 |
|  |  | (2) | 0.26 | 0.24 | 0.20 | 0.36 | 0.32 |
|  |  | (3) | 0.26 | 0.24 | 0.20 | 0.64 | 0.56 |
| Amount of abrasion (mm) | | | 0.18 | 0.18 | 0.16 | 0.16* | 0.15* |

In the amount of abrasion in Table 1 above, as for the surface state of the outer layer after 2,000,000 oscillating motions of each of the spherical annular seal members according to Examples 1 to 3, the reinforcing member made from the knitted metal wire net in the outermost layer had been worn away, and the reinforcing member located in its lower layer was exposed, whereas, in the case of the outer layer of each of the spherical annular seal members according to Comparative Examples 1 and 2, the reinforcing member made from the knitted metal wire net in the outermost layer had been worn away after 1,250,000 oscillating motions, and the heat-resistant material located in its lower layer and containing expanded graphite was exposed. The mark "*" for the amount of abrasion in Table 1 is the amount of abrasion after 1,250,000 oscillating motions.

From the test results shown in Table 1, it can be appreciated that the spherical annular seal members in accordance with Examples 1 to 3 are superior to the spherical annular seal members in accordance with Comparative Examples 1 and 2 in the evaluation of abnormal frictional noise. From the test results of the amount of abrasion shown in Table 1, it can be conjectured that the generation of abnormal frictional noise in the spherical annular seal members according to Comparative Examples 1 and 2 was due to the fact that, after 1,250,000 oscillating motions, the surface of sliding friction turned into a surface where only the heat-resistant material containing expanded graphite was exposed, and that the sliding with the mating member shifted to the sliding with this exposed heat-resistant material.

As described above, according to the spherical annular seal member in accordance with the present invention, the outer layer includes the reinforcing member for the outer layer made from the compressed knitted metal wire net which is knitted by using a fine metal wire with a diameter of 0.10 to 0.20 mm and whose mesh size is 1.0 to 3.0 mm long and 0.5 to 2.5 mm wide, the solid lubricant consisting of a lubricating composition, and the heat-resistant material for the outer layer containing expanded graphite, the heat-resistant material for the outer layer and the solid lubricant are compressed in such a manner as to fill the meshes of the knitted metal wire net of the reinforcing member for the outer layer, and the reinforcing member for the outer layer is overlaid on the partially convex spherical surface of the spherical annular base member densely in the radial direction. Therefore, even if the reinforcing member in the outermost layer is worn away and lost due to the sliding friction with the mating member, the sliding friction with the mating member shifts to the sliding friction with the composite surface where the surface constituted by the reinforcing member located in its lower layer and the surface of the heat-resistant material filled in the meshes of the metal wire net of that reinforcing member are present in mixed form, and the load applied to each of the heat-resistant material and reinforcing member for the outer layer is reduced. As a result, even if very small oscillating motions or excessive axial loads are applied continuously for long periods of time, the possibility of causing damage such as sliding friction tracks on the surface of the mating member is minimal, and it is possible to prevent as practically as possible the coarsening of the mating material surface due to the damage. Hence, it is possible to provide a spherical annular seal member and a method of manufacturing the same which are capable of preventing as practically as possible a decline in sealability between the partially convex spherical surface of the outer layer and the mating member and of preventing the generation of abnormal frictional noise as practically as possible.

DESCRIPTION OF REFERENCE NUMERALS 1, 4, 5, 17, 20: knitted metal wire net
6: expanded graphite sheet
12: superposed assembly
13: tubular base member
15: coating layer
16: multilayer sheet
21, 41: outer surface
24: outer surface forming member
25: cylindrical preform
32: die
34: cylindrical inner surface
35: partially convex spherical surface
39: outer layer
40: spherical annular seal member

The invention claimed is:
1. A spherical annular seal member comprising: spherical annular base member having a partially convex spherical surface and including a metal wire net and an expanded graphite which is compressed and formed integrally with said metal wire net in mixed form, and an outer layer including a metal wire net, a solid lubricant and a compressed expanded graphite and being formed integrally on the partially convex spherical surface, the expanded graphite of the outer layer and the solid lubricant of the outer layer filling meshes of the metal wire net of the outer layer, the metal wire net of said outer layer being made from a compressed knitted metal wire net which is knitted by using a fine metal wire with a diameter of 0.10 to 0.20 mm and whose mesh size is 1.0 to 3.0 mm long and 0.5 to 2.5 mm wide, the metal wire net of said outer layer being overlaid on the partially convex spherical surface of said spherical annular base member in a radial direction, a surface constituted by the metal wire net of the outer layer and a surface constituted by the solid lubricant being mixed in an outer surface of the outer layer, an occupying area ratio of the surface constituted by the metal wire net of the outer layer on the outer surface of said outer layer being 30 to 60%.

2. The spherical annular seal member according to claim 1, wherein the spherical annular base member includes a cylindrical inner surface having a surface constituted by an expanded graphite of said spherical annular base member.

3. The spherical annular seal member according to claim 1, wherein the spherical annular base member includes a cylindrical inner surface having a surface constituted by a metal wire net of said spherical annular base member.

4. The spherical annular seal member according to claim 3, wherein the cylindrical inner surface includes a cylindrical surface having a predetermined width in a direction from a small-diameter side annular end toward a large-diameter side annular end of said spherical annular base member and having an identical diameter between the ends, a truncated conical surface whose diameter is gradually increased from an end of the cylindrical surface toward the large-diameter side annular end of said spherical annular base member and which has a predetermined width in a direction from the end of the cylindrical surface toward the large-diameter side annular end of said spherical annular base member, and an enlarged-diameter cylindrical surface having a predetermined width in a direction from a large-diameter side annular end of the truncated conical surface toward the large-diameter side annular end of said spherical annular base member and having a diameter corresponding to an outside diameter of a pipe end portion of an exhaust pipe, wherein the cylindrical surface is continuously connected at its one end to the small-diameter side annular end of said spherical annular base member, the truncated conical surface is continuously connected at its small-diameter side annular end to another end of the cylindrical surface and is continuously connected at its large-diameter side annular end to one end of the enlarged-diameter cylindrical inner surface, and the enlarged-diameter cylindrical inner surface is continuously connected at its other end to the large-diameter side annular end of said spherical annular base member and is formed with an identical diameter between its both ends.

5. The spherical annular seal member according to claim 1, wherein the solid lubricant contains 23 to 57% by mass of a hexagonal boron nitride, 5 to 15% by mass of hydrated alumina, and 33 to 67% by mass of a polytetrafluoroethylene resin.

6. The spherical annular seal member according to claim 1, wherein each of the spherical annular base member and the outer layer further contains 1.0 to 16.0% by mass of a phosphate.

7. The spherical annular seal member according to claim 6, wherein each of the spherical annular base member and the outer layer further contains 0.05 to 5.0% by mass of nitric acid.

\* \* \* \* \*